United States Patent
Mullaly et al.

(10) Patent No.: US 6,570,524 B1
(45) Date of Patent: May 27, 2003

(54) METHOD FOR REMOTE COMMUNICATION WITH AN ADDRESSABLE TARGET USING A GENERALIZED POINTING DEVICE

(75) Inventors: John Martin Mullaly, Austin, TX (US); Richard Edmond Berry, Georgetown, TX (US); Winslow Scott Burleson, Palo Alto, CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/343,440

(22) Filed: Jun. 30, 1999

(51) Int. Cl.[7] .......................... G08C 19/12; H04L 17/02
(52) U.S. Cl. .................. 341/176; 340/825.69; 359/143
(58) Field of Search .................. 341/176; 340/825.17, 340/825.22, 825.69, 825.72; 359/142, 143, 145

(56) References Cited

U.S. PATENT DOCUMENTS

| | | | |
|---|---|---|---|
| 4,746,919 A | * | 5/1988 | Reitmeier .............. 340/825.72 |
| 4,904,993 A | | 2/1990 | Sato |
| 4,916,532 A | | 4/1990 | Streck et al. |
| 5,227,780 A | | 7/1993 | Tigwell |
| 5,383,044 A | * | 1/1995 | Borchardt et al. .......... 359/145 |
| 5,500,691 A | | 3/1996 | Martin et al. |
| 5,659,883 A | | 8/1997 | Walker et al. |
| 5,675,395 A | | 10/1997 | Martin et al. |
| 6,097,520 A | | 8/2000 | Kadnier |
| 6,127,941 A | * | 10/2000 | Van Ryzin ............. 340/825.69 |

* cited by examiner

*Primary Examiner*—Timothy Edwards
(74) *Attorney, Agent, or Firm*—Kevin L. Daffer; Conley Rose P.C.; Leslie A. Van Leeuwen

(57) ABSTRACT

A method for communication with addressable, electronically-controllable appliances using a generalized pointing device is presented. The pointing device can communicate with dissimilar types of target appliance, and each appliance is associated with an appliance interface that makes the target appliance compatible with the pointing device. Use of the method is believed to allow the convenience associated with the use of a computer's graphical user interface to be realized in communication with physical objects, i.e. the target appliances. The method includes orienting the pointing device for reception of its pointer command signals by an appliance interface of the targeted appliance, transmitting a selection signal from the pointing device to the appliance interface, and transmitting a pointer command signal to the appliance interface. In an embodiment involving two-way communication between the pointing device and appliance interface, the method further includes observing appliance response information transmitted from the appliance interface to the pointing device. The method may include establishment of a line-of-sight transmission path between the pointing device and appliance interface for optical signal transmission. Additionally or alternatively, the method may include use of a non-line-of-sight transmission path for radio frequency signal transmission.

14 Claims, 17 Drawing Sheets

(a)

(b)

(a)

(b)

(a)

(b)

METHOD FOR REMOTE COMMUNICATION WITH AN ADDRESSABLE TARGET USING A GENERALIZED POINTING DEVICE

RELATED APPLICATIONS

This application is related to copending U.S. patent application Ser. No. 09/210,504 by Mullaly and Burleson, entitled "System and Method for a Universal Physical Pointer and Respondent Controls"; and, filed on even date herewith, copending U.S. Application by Mullaly, Berry, and Burleson entitled "System for Remote Communication With an Addressable Target Using a Generalized Pointing Device," and copending U.S. Application by Mullaly, Burleson and Henkler entitled "Method of Directing Communication Between Addressable Targets Using a Generalized Pointing Device."

BACKGROUND OF THE INVENTION

1. Field of the Invention

This invention relates to wireless communications, and more particularly to communication with diverse, electronically controlled devices ("targets"), using a pointing device that can communicate with dissimilar types of targets from a position remote from those targets.

2. Description of the Relevant Art

The following descriptions and examples are not admitted to be prior art by virtue of their inclusion within this section.

Remote control communications systems are often employed to allow control of certain electronic targets from a distance. Such targets may include electronically controlled appliances. Exemplary forms of such appliances include any type of home-based appliance, as well as appliances that are found outside the home such as, for example, automotive controls, industrial controls, or security locks.

Although conventional remote control systems provide convenience over non-remote operation, these systems do have some limitations. One such limitation is that multiple handheld remote control units may be required to control multiple targets (or appliances). Although "universal" remote control units are available which can control multiple appliances, such units typically work for a limited number of appliances, and the remote control unit must be programmed with information about each appliance. The particular appliance to be controlled is selected, typically by pushing a button or key dedicated to that appliance. This may result in a handheld unit having a large number of buttons, which may make the unit more complex or cumbersome to operate so that mistakes are more likely.

Another limitation of conventional remote control communications systems is that remote control is routinely available for only a relatively small variety of appliances. Consumer electronic appliances, for example, are routinely provided with remote control units, but remote control may not be readily available for other types of appliances, such as, e.g., kitchen appliances, lighting, and climate control. Furthermore, conventional remote control communications systems generally rely on optical transmission, so that a clear line of sight between the remote control unit and the appliance is required. It may be desirable, however, to control appliances situated such that a clear line of sight does not exist. For example, control of a stereo or a thermostat from another room may be convenient without having to optically target the appliance to be controlled.

One approach to providing such non-line-of-sight control is to use radio-frequency (RF) transmission in addition to or instead of optical transmission. The RF range is quite broad, extending from approximately 10 kHz ($10^4$ Hz) to about 300 GHz ($3 \times 10^{11}$ Hz), and is used for various types of communications. For example, wireless voice and data communications typically use frequencies in a range from about 800 MHz to a few GHz. The lower frequencies associated with RF communications, as compared to communication at infrared and visible optical frequencies (from about $10^{13}$ to $10^{15}$ Hz), allow transmission over larger distances, and diffraction around or transmission through certain obstacles. Remote control communications systems have been developed which employ RF transmission. Some systems may use solely RF transmission, while others, such as that described in U.S. Pat. No. 5,227,780 to Tigwell, allow RF transmission from a remote control unit to a transponder located in the vicinity of the appliance to be controlled. The transponder then transmits an infrared control signal to the appropriate appliance. Other systems, such as that described in U.S. Pat. No. 4,904,993 to Sato, allow either RF or optical transmission to be chosen, based on the nature of the path between the remote control unit and the appliance to be controlled, and some, such as that described in U.S. Pat. No. 5,659,883 to Walker et al., transmit RF and optical signals simultaneously, allowing the appliance receiver to extract the highest-quality signal.

A disadvantage of using RF transmission is that the ensuing increased transmission range may inadvertently cause communication with multiple appliances simultaneously, when communication with only one appliance may be desired. For this reason, currently available remote control communications systems which use RF transmission must typically be configured so that only a specific receiving appliance will respond to a signal from a remote control unit. Identification of the specific receiving appliance is generally accomplished by transmission of an identifying code from the remote control unit to the receiver associated with the appliance, as described, for example, in U.S. Pat. No. 5,500,691 to Martin et al. The requirement for such an identifying code unfortunately may limit the number of appliances which can be conveniently controlled by a single remote control unit. For example, if codes corresponding to various appliances are stored in the remote control unit, and the particular appliance to be controlled is chosen by pressing a corresponding button on the control unit, space constraints on the remote control unit may allow for only a limited number of appliances to be addressed.

It would therefore be desirable to develop a remote control communications system and method in which a single handheld remote control unit may be used to communicate with a wide variety of appliances. It would further be desirable to develop a system and method allowing communication with an appliance without the requirement of maintaining a line-of-sight path between the handheld unit and the appliance. The desired system and method should be simple to use and require minimal programming by the user.

SUMMARY OF THE INVENTION

The problems outlined above are in large part addressed by a system and method for communicating with diverse electronically controlled targets, henceforth known as appliances, which may perform dissimilar functions and may be produced by different manufacturers. Diversity stems from a myriad of possible electronically controlled appliances found either within the home or outside the home, possibly in an industrial setting. Appliance is thusly used to refer to any device for which remote communication or control may be desired in order to perform any electronically controlled function. For example, electronic devices such as television sets, stereos, and personal computers, household and kitchen appliances such as washing machines and microwave ovens, and other devices such as thermostats, lights, and fans may all be considered "appliances". Each appliance communicated with, or target appliance, has a built-in or retrofitted appliance interface adapted to receive commands transmitted by the pointing device and forward these commands to appropriate appliance circuitry such that the commands are carried out by the appliance.

The system described herein, in which a single pointing device, or pointer, may be used to communicate with and control multiple appliances, is believed to be analogous to user interaction via a graphical user interface (GUI). A simple form of GUI is that by which a user interacts, via the display screen, with executable programs or stored files held within a storage media, such as semiconductor memory or a hard disk drive. GUI is therefore a representation of computer-based entities including programs, files, and commands in a graphical form on a display screen. The user may interact with a program or operating system by selecting and/or moving objects on the screen using a pointing device such as a mouse. Use of a GUI can make interaction with a program or operating system more intuitive than use of a command interface in which specific commands are typed in by the user. This may be true particularly in the case of relatively inexperienced users, because they are freed from having to learn specific commands. According to one embodiment, the pointing device recited herein may include an electronic display on which a GUI is present. The GUI allows a user to select among possibly numerous appliances to be controlled, or to select among multiple commands and/or programs which operate upon the selected appliance. Use of this GUI beneficially makes the generalized pointing device user friendly to select among multiple appliances, of diverse function and/or manufacturer type. For example, the user avoids having to depress a specific appliance button in order to control that appliance, and also avoids needing to learn complex program commands associated with selecting and/or controlling various appliance-type application programs.

In addition to the inclusion of a GUI in an embodiment as described above, the overall system recited herein is believed to be analogous to a GUI in some features of its operation. For example, an important feature of a GUI is that a single set of commands from a pointing device (e.g., "click", "drag", etc.) is used to interact with multiple application programs which may run on a computer. In a similar manner, a single set of commands transmitted by the portable pointing device recited herein may be used to interact with multiple appliances. These commands, or pointer events, may correspond to different functions for different appliances. For example, a downward rolling of a trackball or scroll wheel on the pointing device may correspond to a lowering of light intensity if the target appliance is a light fixture, or to a lowering of volume if the target appliance is a television set or compact disc player. In an analogy with a GUI described above, the portable pointing device may correspond to a pointing device such as a mouse used with a computer, and the target appliance may correspond to an application program running on the computer.

When a GUI is used to interact with an application program or operating system, a "driver" is typically employed to translate between the pointing device commands received and the commands specific to the application program or operating system. Drivers, which are used for various computer peripheral devices, such as disk drives, printers, and keyboards, generally comprise program instructions which are stored in memory associated with the computer during start-up configuration. These program instructions contain information regarding the commands associated with the peripheral device, the commands associated with the application program or operating system, and a correspondence between these two sets of commands. In analogy to the use of drivers in a GUI, the target appliances recited herein may have associated drivers to translate the pointer events (i.e., signals derived by the pointer) transmitted by the portable pointing device into events specific to the target appliance (i.e., signals recognized by the target appliance). This driver may be part of an appliance interface associated with each target appliance. Just as a GUI may make interaction with computer application programs easier and more intuitive, use of the system described herein may simplify remote interaction with and control of appliances, by allowing multiple appliances to be accessed with a single, relatively simple pointing device.

In an embodiment of the system, the portable pointing device comprises one or more actuators, a pointer-side input/output (I/O) interface, and a transmitter. An actuator as used herein is an object on the pointing device (e.g., a button, key, knob, trackball, or scroll wheel) actuated by the user in order to communicate with a target appliance. The actuators generate pointer-derived commands or events (hereinafter "pointer events") which could be described in such terms as "left arrow", "right arrow", "roll up", or "roll down". A unique signal to represent each of these pointer events is created by the I/O interface and forwarded to the transmitter. In an embodiment, the pointing device may also be configured to accept voice commands. The appliance interface associated with the target appliance may include a receiver, an appliance-side I/O interface, and a driver. A pointer event signal transmitted by the pointing device may be detected (i.e., decoded) by the appliance-side I/O interface. The pointer event signal may be translated to a corresponding appliance function by the driver. The appliance interface may also include a visible indicator such as a light-emitting diode to provide feedback to the user that, for example, a signal has been received from the pointing device. In an analogy with a GUI, such a visual indication may be comparable to a visual indication on a computer screen that an icon has been selected using a pointing device (e.g., a changing of the icon color when it is "clicked upon").

The pointing device may be configured to transmit an optical signal, an RF signal, or both. In one embodiment, the system uses only optical signals. This avoids transmittal to other than the intended appliance, but requires a relatively short line-of sight path between the pointing device and the appliance. In an alternative embodiment, the system is configured to use both optical and RF signals. In this embodiment, an optical signal is used to select a particular appliance for communication. The appliance interface is configured such that once the appliance has been selected, it will respond to subsequent RF signals. The selected appliance may then be communicated with using RF signals, so that the pointing device may be farther away from the appliance, and a line-of-sight path may not be needed. Because only the selected appliance responds to the RF signals, unwanted communication with other appliances does not occur. It is therefore not necessary to have dedicated remote control units for each appliance, or to use appliance identification codes. In applications requiring security (e.g., door openers and locks), however, the system may be configured to use pointing device identification codes. For example, an appliance interface may be configured to respond to only those selection signals received from particular pointing devices.

The system of the embodiments described above may be configured for essentially one-way communication from the pointing device to the appliance. In other embodiments, however, the system may be configured for two-way (bi-directional) communication between the pointing device and the appliance. In such embodiments, the pointing device and appliance interface each include both a transmitter and a receiver. The pointing device includes a visible indicator so that information may be transmitted from the appliance to the user. In one embodiment, the visible indicator is a display screen, and information may be transmitted from the appliance in the form of a menu which appears on the pointer display screen. In this way, appliance-specific options may be communicated to the user through a GUI associated with the pointer display screen.

A method for using the remote control communications system described above is also contemplated. The pointing device is oriented such that a signal transmitted by the pointing device may be received by the appliance interface of the target appliance. An actuator on the pointing device is then used to transmit a signal from the pointing device to the appliance interface. A first signal sent may be a selection signal to select the desired target appliance, and subsequent signals may be command signals to elicit a desired response from the selected appliance. In this case, a visible indication that the appliance has been selected may be observed before the command signals are transmitted. Such a visible indication may be made using an indicator on the appliance interface, or with an indicator on the pointing device. For embodiments in which a pointer configured to transmit both optical and RF signals is used, an optical signal is preferably used to select the target appliance. Subsequent commands may be sent using either optical or RF signals.

For embodiments in which the system is configured for two-way communication between the pointer and the appliance interface, the method further includes observing a response from the appliance interface after selection of an appliance. For example, the response could take the form of a menu containing appliance-specific options available for interaction with the appliance. Subsequent commands sent from the pointer to the appliance interface may be prompted by options or directions communicated from the appliance interface to the pointer.

In several embodiments described above, the system is used for communication with one of any number of pointer-compatible appliances using a generalized pointer. In other embodiments, the system recited herein may be used to direct communication between more than one appliance. For example, the pointer might be used to direct an interaction between a television set and a stereo system, such that the sound from the television is transmitted through the stereo system speakers. As another example, a file from a workplace computer might be transferred to a home computer using the pointer. Use of the pointer to transfer data between appliances or to otherwise direct communication between appliances may be analogous to the "drag-and-drop" function in a GUI, in which, for example, a icon representing a file is copied from one application into another by dragging an icon representing the file on a computer screen to an icon representing an application. This drag-and-drop method is preferably implemented using an embodiment of the system allowing two-way communication between the pointing device and each appliance. The method is typically implemented using appliances which can communicate with each other in some fashion, such as through a wired or wireless network. Use of the pointer-directed method may greatly simplify cooperation between appliances and combination of their functions, in that users may select the desired appliances for the interaction without knowing details such as their network addresses. In some embodiments, the sole communication pathway between the appliances may be provided by the pointer, if the pointer is configured for two-way communication.

A computer-usable carrier medium having program instructions executable to implement one of the above-described methods is also contemplated herein. The carrier medium may be a storage medium, such as a magnetic or optical disk, a magnetic tape, or a memory. In addition, the carrier medium may be a wire, cable, or wireless medium along which the program instructions are transmitted, or a signal carrying the program instructions along such a wire, cable or wireless medium. In one embodiment, the carrier medium may contain pointer command data, appliance function data, a correspondence between the pointer command and appliance function data, and appliance-specific instructions based on the appliance function data. In another embodiment, the carrier medium may contain program instructions executable to implement detection of a signal transmitted from the pointing device to an appliance interface, extraction of a pointer command from the signal, identification of an appliance function corresponding to the pointer command, and forwarding of an instruction for implementing the appliance command to appropriate appliance circuitry.

BRIEF DESCRIPTION OF THE DRAWINGS

Other objects and advantages of the invention will become apparent upon reading the following detailed description and upon reference to the accompanying drawings in which.

Figure 1:
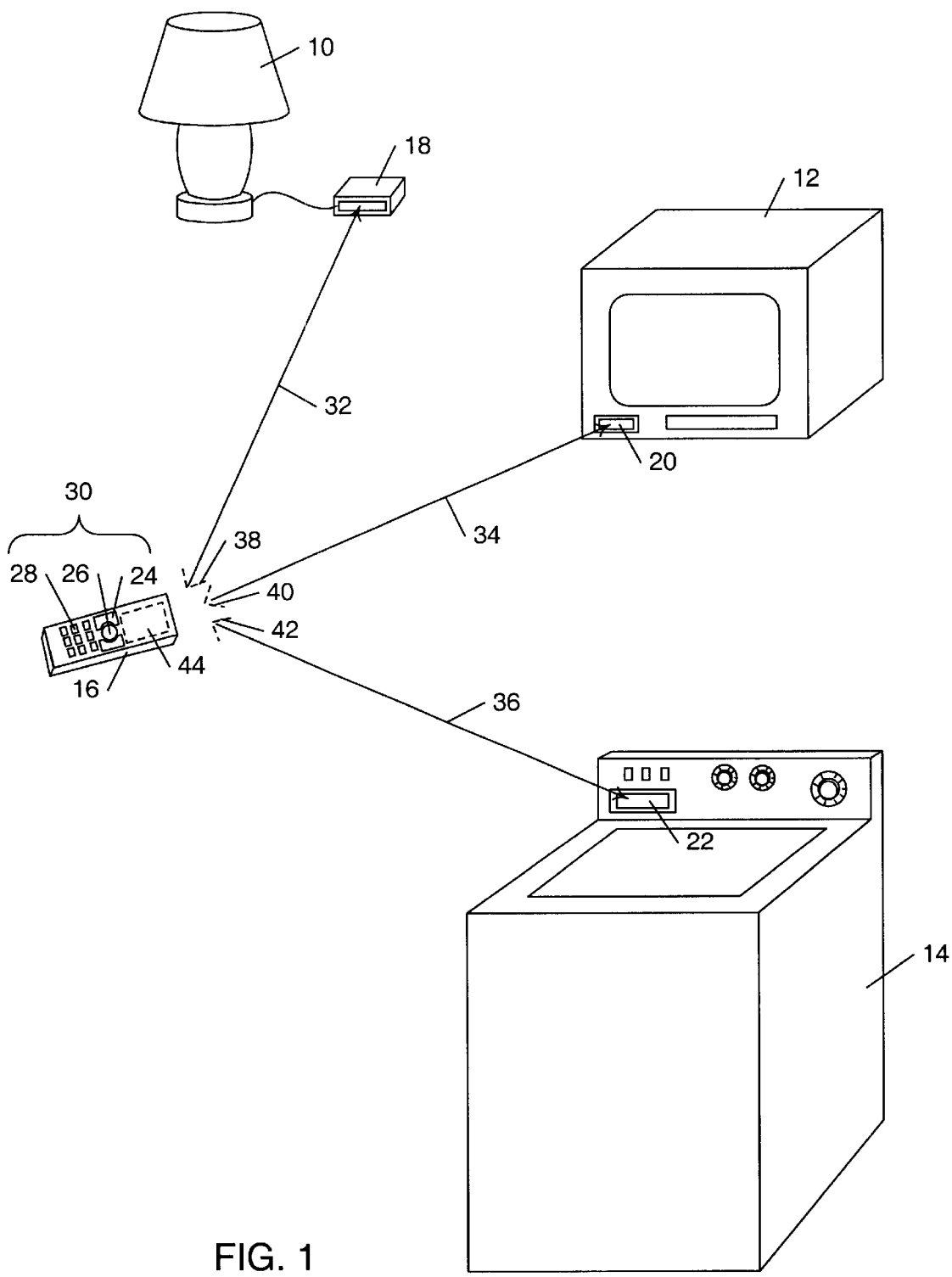
FIG. 1 illustrates communication with diverse appliances using a generalized pointing device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates the concept of communication with addressable targets or appliances using a generalized pointing device, or pointer. "Addressable" as used herein indicates that an appliance may be specifically selected to receive a signal intended for that particular appliance alone, though the signal may be transmitted in such a way that it is available to reception circuitry of other appliances. For example, the signal may be broadcast in all directions using an RF signal, but acted upon by only one of the appliances in its path, the appliance for which the RF signal is decoded and therefore intended. Mechanisms by which an appliance is specifically addressed may include, for example, transmission of a directed optical selection signal along a line-of-sight path between a pointing device and the appliance, or transmission of a code (e.g., address) recognized by only the intended appliance as part of the signal.

In the embodiment of FIG. 1, the system including pointing device 16 and one or more of appliance interfaces 18, 20 and 22 allows remote communication with one or more of the corresponding addressable appliances 10, 12, and 14. Each of the appliance interfaces is configured specifically for its corresponding appliance, and is operably coupled to this appliance. "Operably coupled" as used herein indicates a coupling in such a way that allows operation of the combination. Appliance interface 18, for example, is coupled to appliance 10, a lamp, such that data including, for example, instructions and control signals may pass between them. The coupling may therefore be in the form of, e.g., wire, cable, metallization line or wireless transmission medium. The appliance interface may be packaged in a separate unit from the appliance, as for interface 18 and appliance 10, or it may be configured upon or within the appliance, as for appliance interfaces 20 and 22 for appliances 12 and 14, respectively. In an alternative embodiment, a single appliance interface may be operably coupled to more than one appliance. In such an embodiment, a means must be provided for the pointing device to indicate which appliance is to be addressed through the interface. Although household appliances are shown in FIG. 1, an appliance may be any electronically controllable device. The appliances of FIG. 1 are addressable by pointing device 16 using their respective appliance interfaces. An appliance interface may be combined with an appliance as part of a retrofit of the appliance to make it pointer-compatible, or included in the manufacture of a pointer-compatible appliance.

Pointing device, or pointer, 16 includes one or more of various actuators 30, which may include a button 24, trackball 26, and key 28. Actuators 30 may include any actuator operable by a user, such as a button, knob, key, trackball, or scroll wheel. In an embodiment, a pointer such as pointer 16 may be configured to accept voice commands instead of or in addition to actuator operations. Pointer 16 and appliance interfaces 18, 20 and 22 may be configured either for one-way communication from the pointer to the appliance interface or two-way communication between the pointer and the interface. Solid arrows 32, 34, and 36 represent transmission of signals from pointer 16 to appliance interfaces 18, 20, and 22, respectively. In embodiments for which a focused optical signal is transmitted, pointer 16 is oriented to form a line-of-sight path to the receiving appliance interface. In some embodiments, the system is configured for two-way communication, as indicated by dashed-line arrowheads 38, 40, and 42 in FIG. 1. In such embodiments, pointer 16 includes a display device such as display screen 44, drawn with a dashed line to show correspondence with the two-way communication indicated by arrowheads 38, 40 and 42.

Pointing device 16 is preferably a compact unit for handheld operation, suitable for being conveniently carried by a user. Because pointer-compatible appliances may be located both inside and outside of a home or office, use of the pointing device as a "personal" pointer is contemplated. In preferred embodiments for which preprogramming of appliance-specific information such as appliance identification codes is not required, a user may use such a personal pointer to operate appliances encountered in multiple places to which the user may go, such as homes, offices, and public places. Appliances for which limited access is desired could have interfaces configured to allow the interface to be selected by only particular pointing devices (for example, the pointer could transmit a pointer-specific, rather than appliance-specific, identification code).

Figure 2:
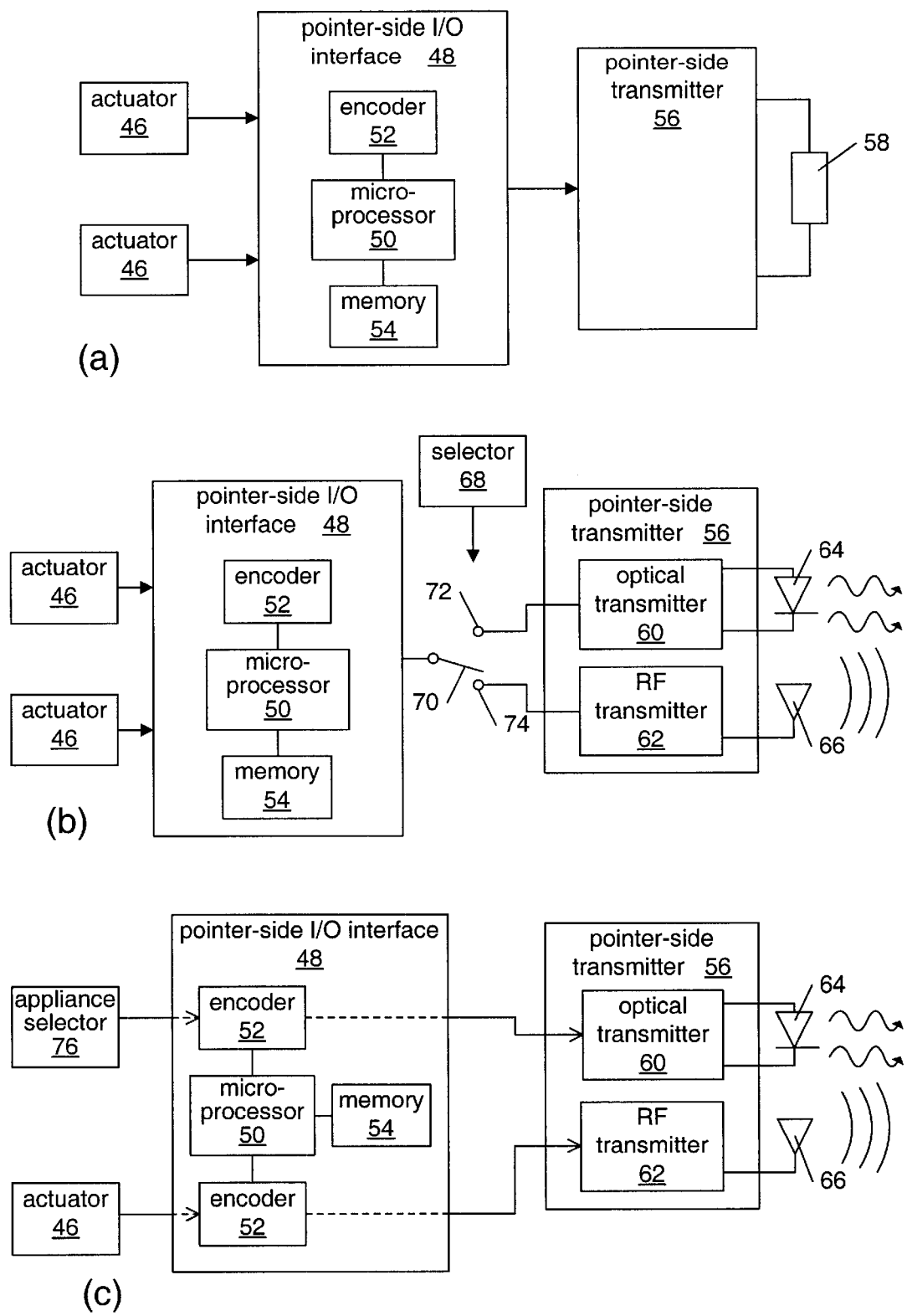
FIG. 2. includes block diagrams for exemplary embodiments of a pointing device for one-way communication with a pointer-compatible appliance.

Block diagrams illustrating exemplary embodiments of a pointing device configured for one-way communication are shown in FIG. 2. Blocks 46 represent actuators such as actuators 30 in FIG. 1. Operation of actuators 46 generates pointer commands, or pointer events, which are forwarded to pointer-side I/O interface 48. In the embodiment of FIG. 2(*a*), I/O interface 48 includes a microprocessor 50, encoder 52 and memory 54. Encoder 52, as controlled by microprocessor 50, generates a unique pointer event signal for each pointer event forwarded by actuators 46, and the pointer event signal is forwarded to pointer-side transmitter 56 for transmission to an appliance interface. This encoding of the pointer event into a signal, may include, for example, conversion of parallel signal into a signal suitable for serial transmission. Memory 54 may be accessed by microprocessor 50 in representing the incoming pointer events by pointer event signals. Memory 54 may include, for example, data providing a correspondence between the signals forwarded by actuator and the pointer event signals to be forwarded to the transmitter. Memory 54 could also include a buffer section for temporary storage of pointer event data used by the microprocessor or encoder, and/or identification code information for the pointer, for use in embodiments in which a pointer identification code is included in transmitted signals. The pointer event signal is forwarded to pointer-side transmitter 56, which includes transmitting element 58. Transmitting element 58 may be an optical transmitting element, such as a laser diode or light-emitting diode, or an antenna for RF transmission.

In FIG. 2 and in all other block diagrams appearing herein, the blocks are intended to represent functionality rather than specific structure. Implementation of the represented device using circuitry and/or software could involve combination of multiple blocks into a single circuit, or combination of multiple circuits to realize the function of a block. For example, memory 54 and/or encoder 52 of FIG. 2 could be included within microprocessor 50 in some embodiments, or some functions of encoder 52 could be implemented by circuitry associated with actuators 46.

An embodiment of a pointer having both optical and RF transmission capability is shown in FIG. 2(*b*). The pointer event signal from I/O interface 48 is forwarded to switch 70, the position of which is configured by selector 68. Selector 68 may be an actuator operated by the user. If the pointer is oriented to provide a relatively short, line-of-sight transmission path to the target appliance, switch 70 may be connected to terminal 72 for forwarding of the pointer event signal to optical transmitter 60. This configuration of switch 70 may be used, for example, to select a particular appliance without using an appliance identification code. Alternatively, switch 70 may be connected to terminal 74 for forwarding of the pointer event signal to RF transmitter 62. Optical element 64, typically a light emitting diode or laser diode, is used by optical transmitter 60, while transmitting antenna 66 is used by RF transmitter 62.

An alternative configuration of a dual-mode (both optical and RF transmission) pointing device is illustrated by the block diagram of FIG. 2(*c*). Instead of a switch to select between the optical and RF transmitter, the pointing device of FIG. 2(*c*) has an actuator dedicated to appliance selection, appliance select actuator 76. Operation of actuator 76 results in a selection signal being sent from I/O interface 48 to optical transmitter 60. Pointer events generated by other actuators are converted by I/O interface 48 to pointer event signals which are forwarded to RF transmitter 62. The embodiment of FIG. 2(*c*) may be useful for implementing a method in which appliance selection is performed using a relatively focussed optical signal, and a relatively short line-of-sight path. Appliance interfaces for target appliances are preferably configured such that received signals are not acted upon unless the appliance has been selected. Subsequent signals may therefore be sent using the RF transmitter, allowing longer, non-line-of-sight transmission paths, without inadvertent communication with unselected appliances.

In the embodiment of FIG. 2(*c*), the signals for optical transmission and those for RF transmission are shown as forwarded through separate encoders 52. Other arrangements may also be suitable, however, such as using separate channels of a multiple-channel encoder. The dashed-line connections within I/O interface 48 indicate that actuators 76 and 46 are functionally coupled to encoders 52 which are functionally coupled to the appropriate transmitter. Such coupling may not be direct, however, but could be mediated by microprocessor 50 or other circuitry or software. Dashed lines are used in a similar manner in other block diagrams shown herein, such as those in FIGS. 7 and 8.

Figure 3:
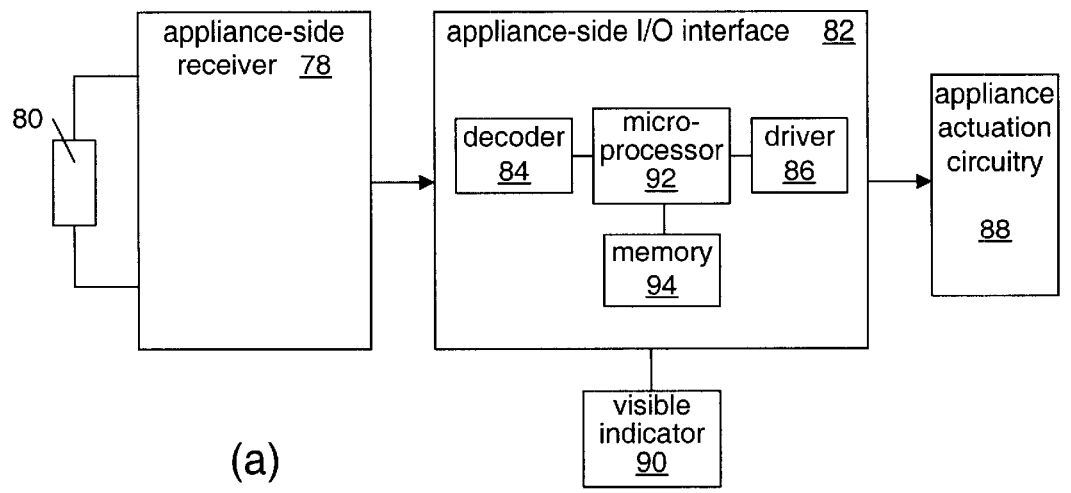
FIG. 3 includes block diagrams for exemplary embodiments of an appliance interface for one-way communication with a pointing device.
Figure 3:
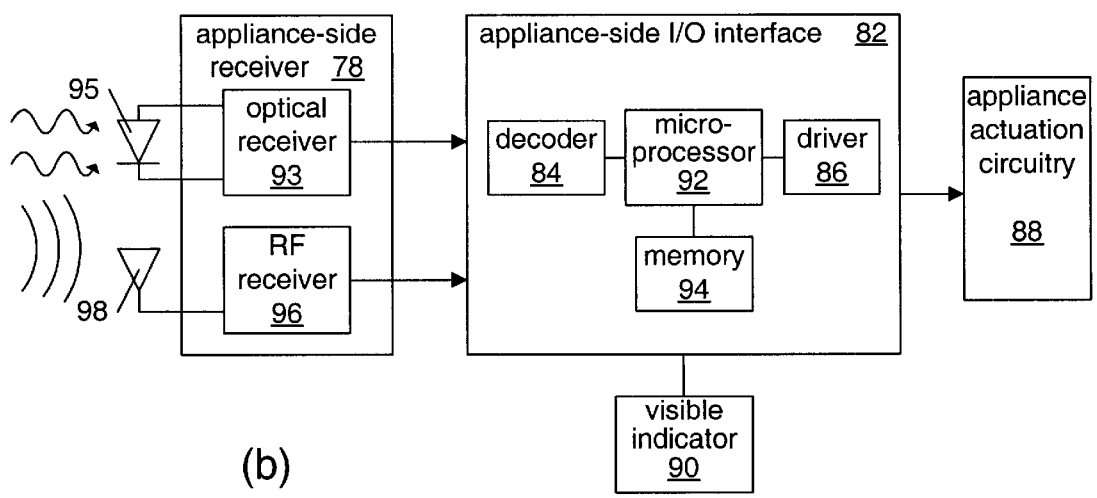

Block diagrams illustrating exemplary embodiments of an appliance interface configured for one-way communication with a pointing device are shown in FIG. 3. In the embodiment of FIG. 3(*a*), appliance-side receiver 78 uses detector 80 to detect a pointer event signal transmitted by a pointing device. Detector 80 may be, for example, a photodetector for receiving optical signals or an antenna for receiving RF signals. The received signal is forwarded to appliance-side I/O interface 82, which may include decoder 84 and driver 86, microprocessor 92 and memory 94. Decoder 84, as controlled by microprocessor 92, may extract the pointer command or event corresponding to the pointer event signal received by receiver 78, and convert it to a convenient form for further processing. This decoding may include, for example, converting a serially-transmitted signal to a parallel signal. The decoder may further determine whether the appliance has been selected, and "ignore" any received pointer event signals if the appliance is not selected.

Driver 86, as controlled by microprocessor 92, identifies the appliance-specific function associated by the pointer command. Examples of possible appliance-specific functions include turning on a light, selecting a temperature, or actuating a lock. Memory 94 may contain data establishing a correspondence between pointer events and appliance functions for use by driver 86. An instruction to implement the appliance-specific function is forwarded to appliance actuation circuitry 88. Depending on the particular configuration of the pointer-compatible appliance, appliance actuation circuitry 88 may be either internal or external to the appliance interface, or divided between the appliance interface and another part of the appliance. The appliance interface may also include a visible indicator 90, shown coupled to I/O interface 82. Indicator 90 may, for example, be a visible light that is illuminated when the appliance is selected to provide a confirmation to the user of the pointing device. An embodiment of an appliance interface with both optical and RF reception capability is shown in FIG. 3(*b*). In this embodiment, receiver 78 includes optical receiver 93 using photodetector 95, and RF receiver 96 using receiving antenna 98.

Figure 4:
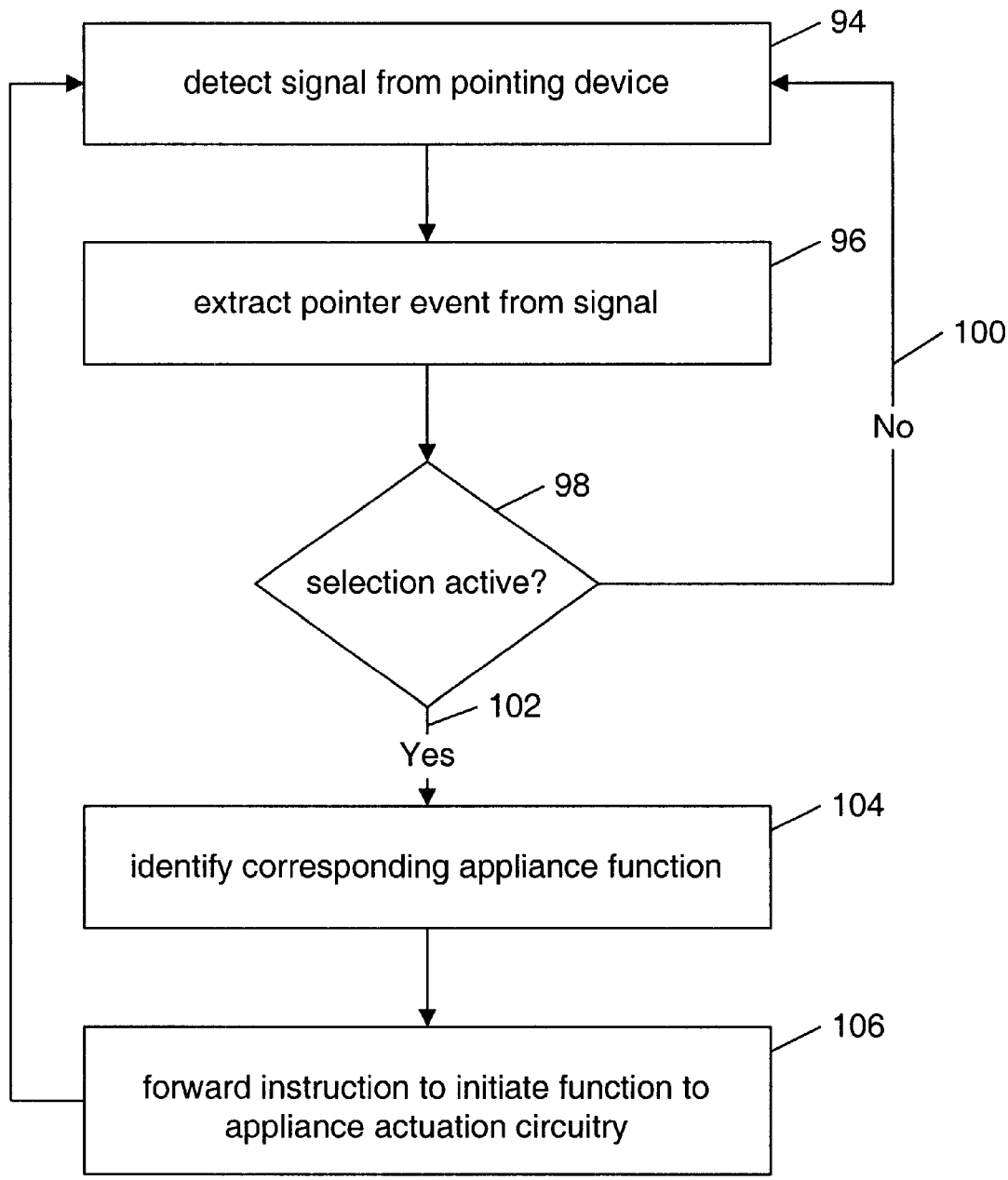
FIG. 4 is a flow diagram illustrating operation of an appliance interface as shown in FIG. 3.

Operation of an appliance interface as shown in FIG. 3 is illustrated by the flow diagram of FIG. 4. After a transmitted pointer event signal is detected (box 94), the corresponding pointer event is extracted from the detected signal (box 96). The signal detection may be performed by a receiver such as receiver 78 in FIG. 3, and the extraction of the pointer event or command may be performed by a decoder such as decoder 84 in FIG. 3. If selection of the appliance is not active (no selection signal has been received) the appliance interface continues to detect incoming signals until a selection signal is received (branch 100 of decision box 98). If the appliance is selected (branch 102 of decision box 98), on the other hand, the appliance interface goes on to identification of the appliance function which corresponds to the extracted pointer event (box 104). This identification may be performed by a driver such as driver 86 in FIG. 3. An instruction to initiate the identified appliance function is then forwarded to appliance actuation circuitry (box 106), such as circuitry 88 in FIG. 3.

As indicated in FIG. 3, identification of the appliance function corresponding to a received pointer event may be implemented using a microprocessor and memory such as microprocessor 92 and memory 94. In such an implementation, the memory may include a section containing a correspondence between pointer events extracted from the detected pointer event signals and appliance functions to be performed. In some embodiments, the pointer events may be actual memory location addresses. In this case, the correspondence between pointer events and appliance functions may be created by programming the appliance function data into memory locations having addresses matching the corresponding pointer events.

Figure 5:
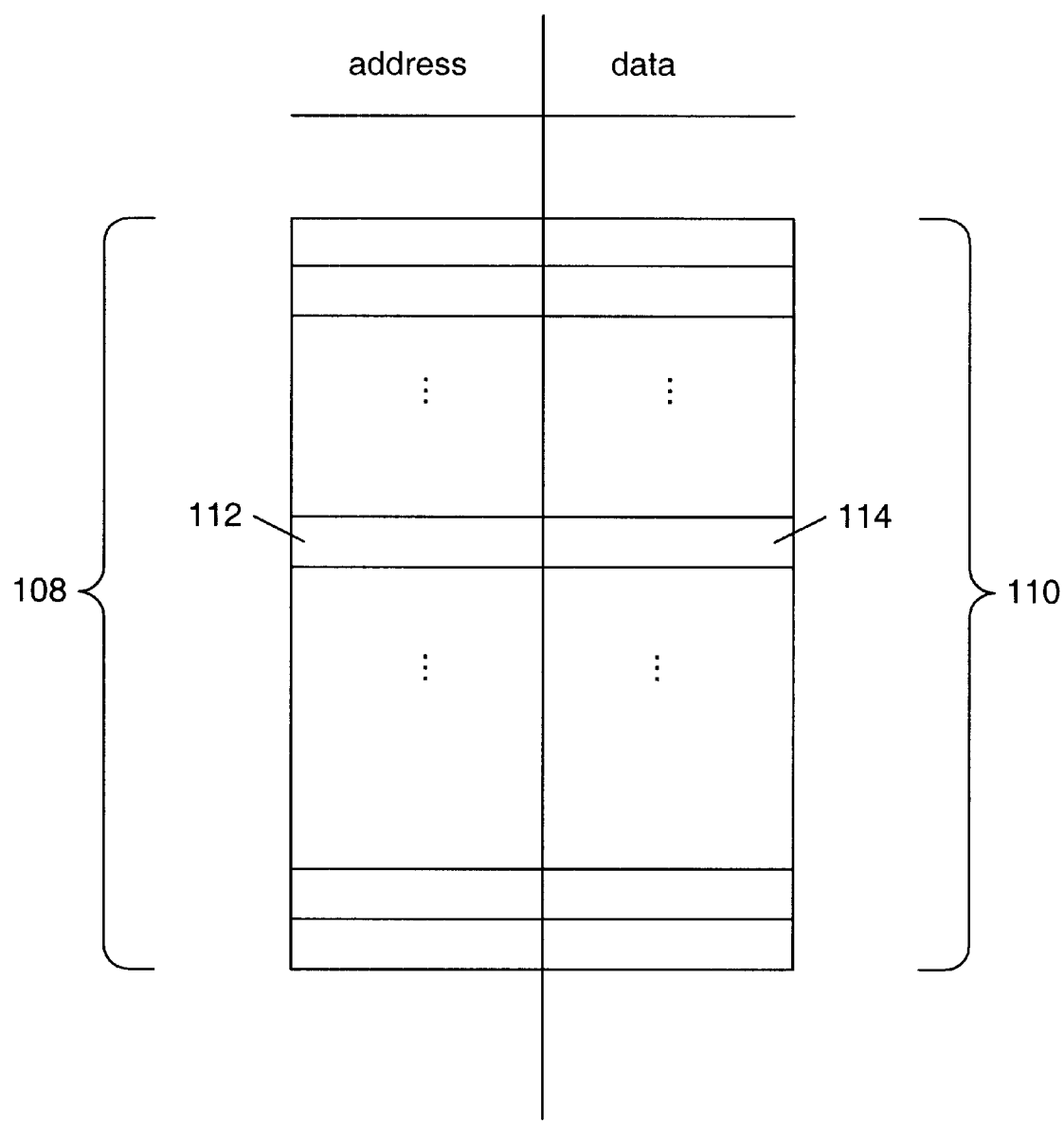
FIG. 5 illustrates an exemplary data structure used in an appliance interface.

An exemplary memory section containing a correspondence between pointer events and appliance functions for such an embodiment is shown in FIG. 5. Address range 108 is the range of address values included in the pointer event signals which may be received by the appliance interface. Data block 110 contains the appliance function data corresponding to the pointer events represented by the addresses in range 108. In the embodiment of FIG. 5, each address within range 108 corresponds to data representing an appliance function. For example, location address 112 corresponds to the data in memory location 114. The data in location 114 may comprise a sequence of "1" and "0" bits which, when forwarded to appropriate appliance actuation circuitry, may cause particular connections to be made or broken such that the corresponding appliance function is initiated. Data block 110 may be programmed by a microprocessor during a configuration cycle occurring, for example, when the appliance power is turned on. Such programming during a configuration cycle is similar to the operation of peripheral drivers used by computers.

FIG. 5 shows only one possible embodiment of a section of memory containing correspondence data between pointer events and appliance functions, and other data structures could be used. For example, the pointer event signals received may not be in the form of memory location addresses, but rather represented using some other code. In such a case, a data structure such as a lookup table or array may be used, in which one column contains the pointer event codes, and another column contains the corresponding appliance function data.

Figure 6:
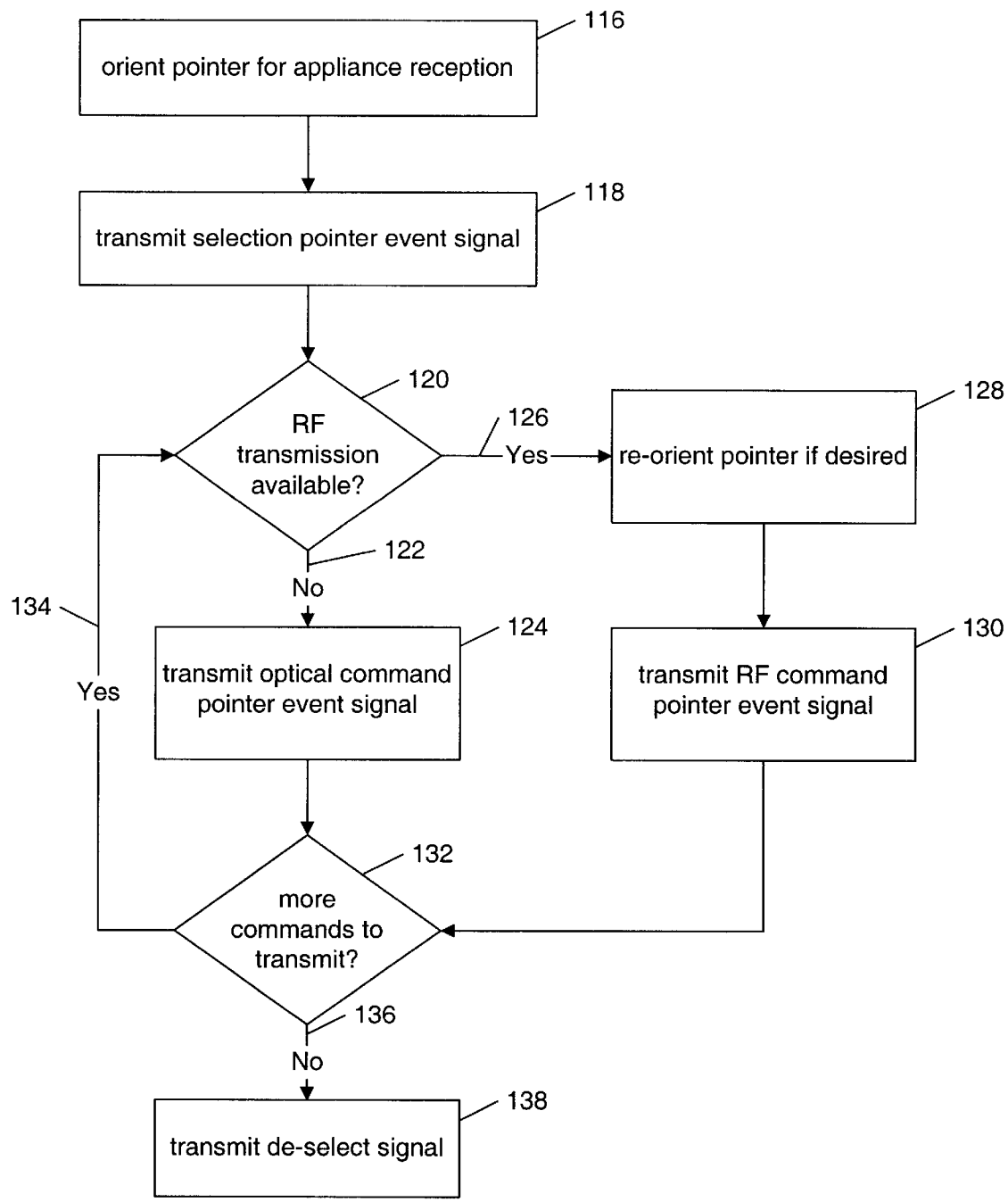
FIG. 6 is a flow diagram illustrating a method of using a pointing device for one-way communication with a pointer-compatible appliance.

Turning now to FIG. 6, a flow diagram is shown which illustrates an embodiment of a method for using a pointing device for one-way communication. The method begins with orientation of the pointing device such that the signal to be transmitted may be received by the appliance to be selected for communication (box 116). In a preferred embodiment, an optical signal is used for appliance selection. In such an embodiment, orientation involves establishing a relatively short, line-of-sight path between the pointer and the targeted appliance interface. As described above, this selection method allows selection of a specific appliance without a requirement for programming of the pointing device with appliance-specific information such as appliance identification codes. A pointer event signal for appliance selection is then transmitted (box 118), typically by operating an actuator on the pointing device. In embodiments for which the targeted appliance interface has a visible indicator such as a light to confirm selection, such a confirmation may be observed after the selection signal is sent.

If the pointing device has RF transmission capability (branch 126 of box 120), it may be reoriented if desired (box 128) before transmission of an RF pointer event signal for sending a command to the appliance (box 130). For example, if an optical selection signal was transmitted along a line-of-sight path, subsequent RF command signals may be receivable by the appliance interface even if the pointer is moved to establish a longer, non-line-of-sight path. If RF transmission is not available (branch 122 of box 120), an optical pointer command signal is transmitted (box 124). If there are additional commands to be transmitted to the selected appliance (branch 134 of box 132), the command signal transmission is repeated.

When communication from the pointing device to the selected appliance is no longer needed (branch 136 of box 132), a de-selection signal is transmitted to the appliance interface (box 138), so that the appliance does not respond to further commands not intended for it. In one embodiment, a specific actuator operation (or sequence of actuator operations) may be reserved for sending a de-select signal. Alternatively, the same actuator could be used to toggle between select and de-select. Although this use of a single actuator may help reduce pointer size and complexity, in embodiments for which an optical selection signal is used, it would require that a line-of-sight path be established for the de-select transmission. This could be inconvenient in cases for which the pointer is reoriented to transmit RF command signals. In addition to (or instead of) the use of a de-select signal, the appliance interface may be configured such that a selection expires after a predetermined time interval in which no pointer event signals are received.

Figure 7:
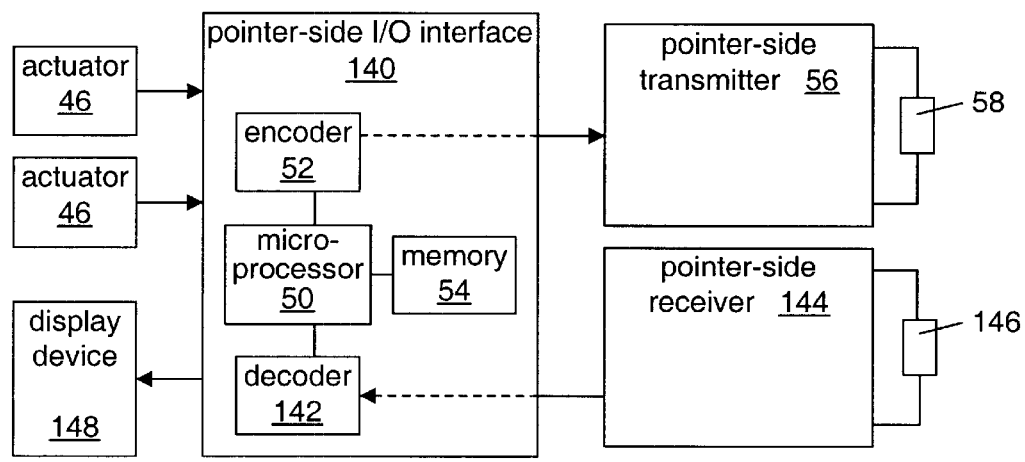
FIG. 7 includes block diagrams illustrating exemplary embodiments of a pointing device for two-way communication with a pointer-compatible appliance.
Figure 7:
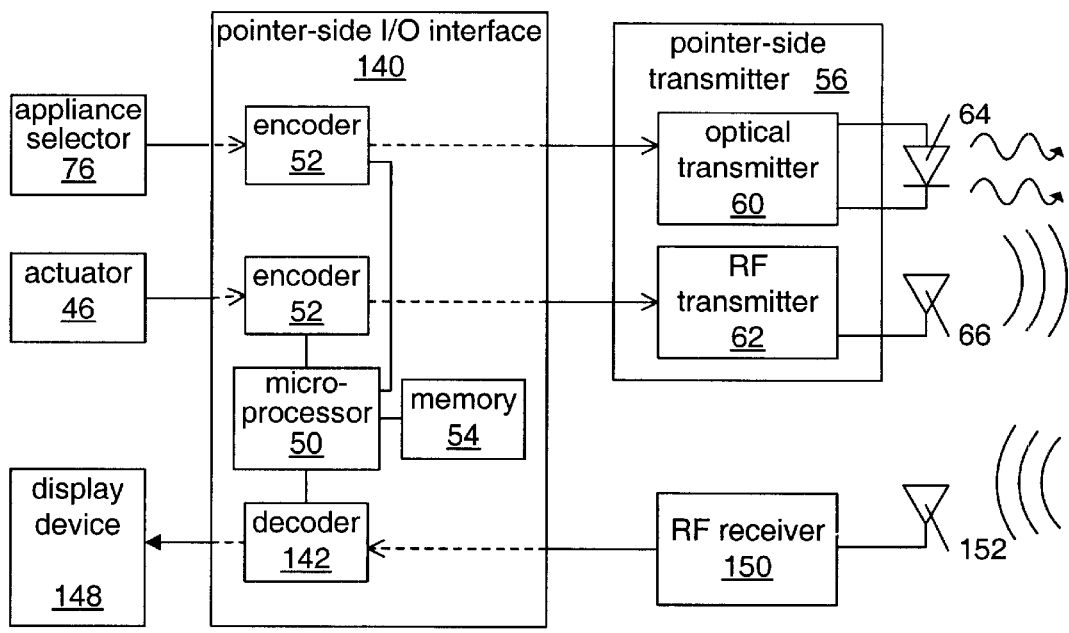

The embodiments described above in reference to FIGS. 2–6 involve use of a pointing device for one-way communication with pointer-compatible appliances. Particularly in the case of appliances with multiple controllable functions, the size and complexity of the pointing device may be reduced if two-way communication is employed. Block diagrams illustrating exemplary embodiments of a pointing device capable of such two-way communication are shown in FIG. 7. As in the case of the pointer shown in FIG. 2, actuators 46 forward pointer commands to a pointer-side I/O interface which creates pointer event signals for the commands and forwards them to transmitter 56. However, I/O interface 140 of FIG. 7(a) differs from interface 48 of FIG. 2 in that it also accepts appliance response information received by pointer-side receiver 144. I/O interface 140 may therefore include decoder 142 in addition to microprocessor 50, encoder 52, and memory 54. Decoder 142 is similar in function to decoder 84 of FIG. 3, except that the signals being processed are received from an appliance interface rather than a pointing device. Furthermore, pointer-side receiver 144 and detector 146 are similar to receiver 78 and detector 80 of FIG. 3. Information received from the appliance interface is made available to the user of the pointing device using display device 148. In some embodiments, display device 148 could be as simple as a light which illuminates or blinks in response to signals from the appliance interface. In a currently preferred embodiment, display device 148 is a display screen, such as a liquid crystal display (LCD) screen, upon which appliance-specific information such as available control options may be displayed.

A block diagram illustrating a two-way pointer with both optical and RF transmission capability is shown in FIG. 7(b). In a manner similar to that shown in FIG. 2(c), appliance selection actuator 76 may be used to initiate transmission of an optical selection signal using optical transmitter 60 and optical transmitting element 64. Other actuators 46 may be used to initiate transmission of other pointer commands using RF transmitter 62 and antenna 66. Because the RF transmission capability of the pointing device of FIG. 7(b) may allow the pointing device to establish a relatively long, non-line-of-sight transmission path, RF receiver 150 and antenna 152 are used to detect any RF signals transmitted from the appliance interface to the pointing device. In an alternative embodiment, pointer-side receiver 144 may include both RF and optical receivers.

Figure 8:
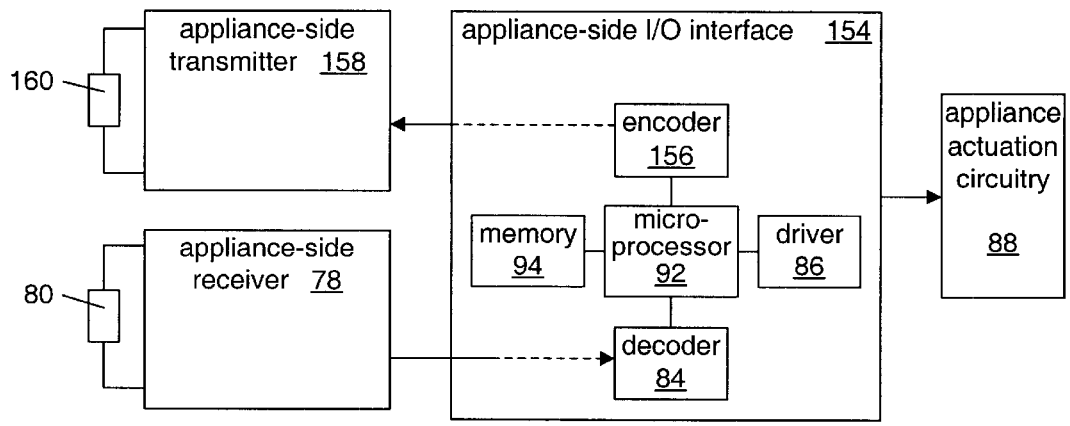
FIG. 8 includes block diagrams illustrating exemplary embodiments of an appliance interface for two-way communication with a pointing device.
Figure 8:
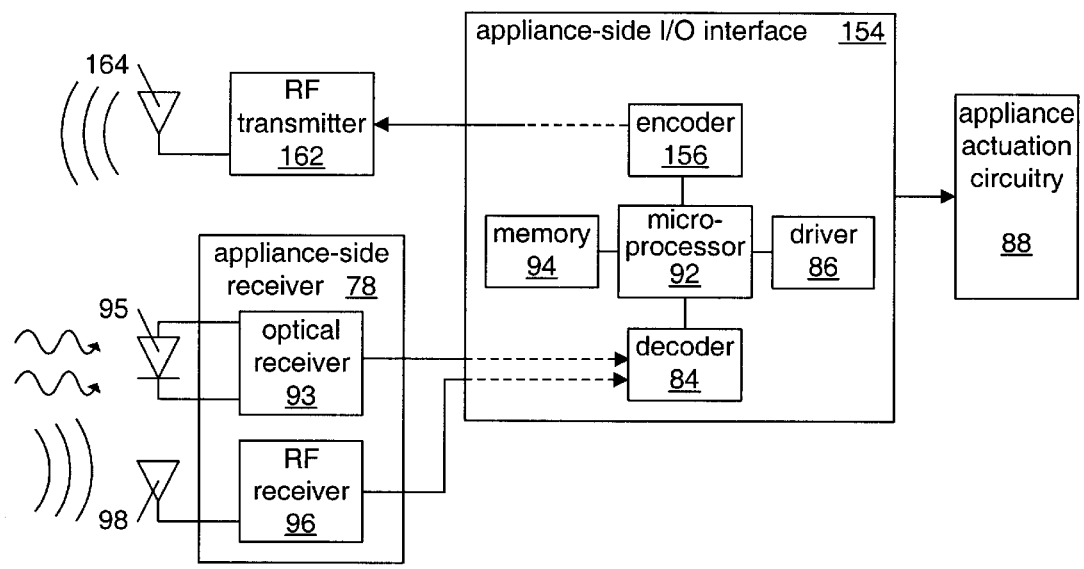

Block diagrams illustrating embodiments of an appliance interface configured for two-way communication with a pointing device such as that of FIG. 7 are shown in FIG. 8. As in the case of the appliance interface shown in FIG. 3, signals transmitted by a pointing device are detected using appliance-side receiver 78 and detector 80, and forwarded to an appliance-side I/O interface, which forwards instructions for appropriate appliance functions to appliance actuation circuitry 88. In the embodiment of FIG. 8(a), however, appliance-side I/O interface 154 differs from I/O interface 82 of FIG. 3 in that it also transmits information to the pointing device using appliance-side transmitter 158 and transmitting element 160. I/O interface 154 may therefore include encoder 156 in addition to microprocessor 92, driver 86, decoder 84, and memory 94. Encoder 156 is similar to encoder 52 of FIG. 2, except that encoder 156 generates signals containing appliance response information (or "user entry control information") sent from the appliance interface to the pointing device, rather than pointer commands sent in the opposite direction. Furthermore, appliance-side transmitter 158 and transmitting element 160 are similar to transmitter 56 and transmitting element 58 of FIG. 2.

The block diagram of FIG. 8(b) illustrates an embodiment of a two-way appliance interface configured to receive both optical and RF signals. Such an embodiment may be compatible with a pointing device such as that of FIG. 7(b). In a manner similar to that shown in FIG. 3(b), signals may be received using both optical receiver 93 with photodetector 95 and RF receiver 96 with receiving antenna 98. To allow for a variety of path configurations between the pointing device and appliance interface, appliance response information may be transmitted to the pointing device using RF transmitter 162 and antenna 164. To avoid transmitting such appliance response information to other pointing devices which may be within target range, a pointer identification code (not an appliance identification code) is preferably included in signals sent both from the pointer to the appliance interface and vice versa, when two-way communication is being used. In this way, a pointing device can be configured to ignore any appliance response signals not intended for it specifically. In an alternative embodiment, appliance-side transmitter 158 may include both optical and RF transmitters.

Figure 9:
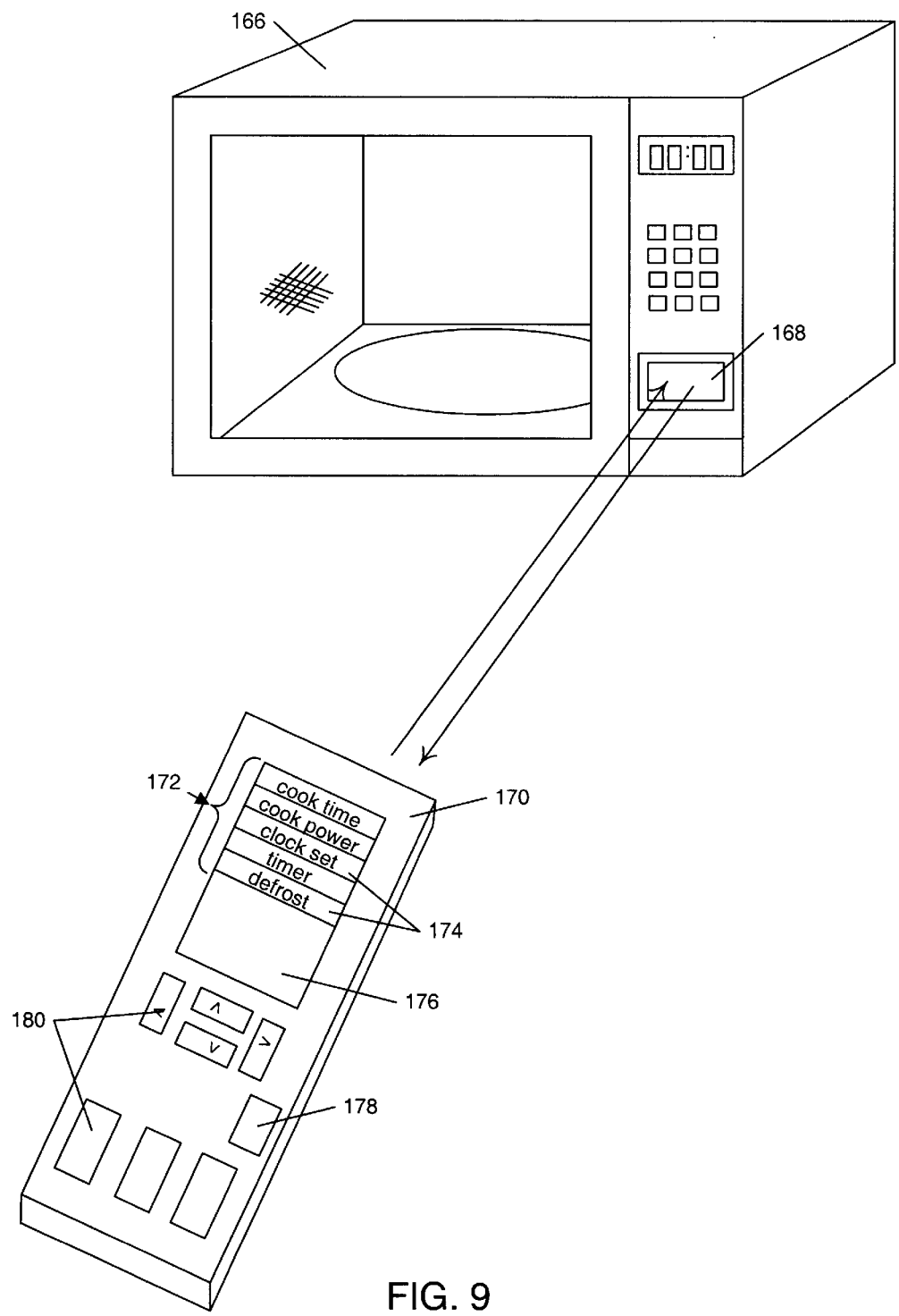
FIG. 9 illustrates an embodiment of two-way communication between a pointing device and a pointer-compatible appliance.

Turning now to FIG. 9, an example of use of two-way communication between a pointing device and an appliance is illustrated. Microwave oven 166 includes appliance interface 168 and is remotely operated using pointing device 170. After selection of oven 166 by pointer 170, user entry control information 172 may be transmitted to pointer 170 by appliance interface 168, and displayed on display screen 176. In this embodiment, the user entry control information takes the form of menu items 174, which include options as to which function of oven 166 is to be controlled. An option may be selected by the user through the GUI of the pointing device in a manner similar to the use of a pull-down menu on a computer monitor screen. In the embodiment of FIG. 9, mode key 178 is used to choose whether the other actuators 180 on the pointing device are used to directly control appliance 166, or to interact with the GUI of display screen 176. Alternatively, the pointing device could be configured with separate sets of actuators, one for the appliance, and one for the screen.

Figure 10:
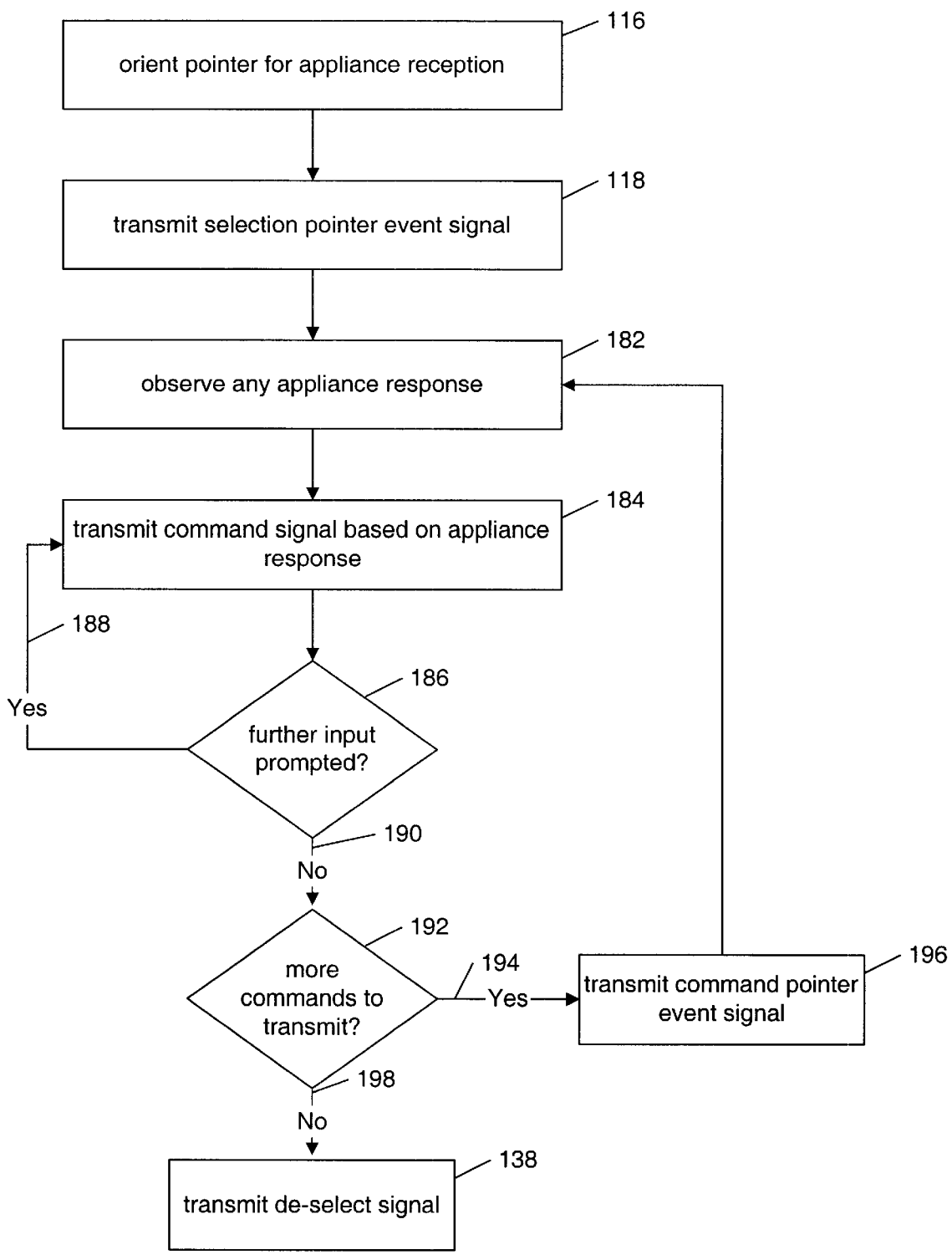
FIG. 10 is a flow diagram illustrating a method of using a pointing device for two-way communication with a pointer-compatible appliance.

A flow diagram illustrating an embodiment of a method for using a pointing device for two-way communication is shown in FIG. 10. As in the case of the one-way communication method shown in FIG. 6, the pointing device is first oriented in such a manner that a transmitted signal may be detected by the appliance to be targeted (box 116), and a selection signal is transmitted to the appliance interface of the targeted appliance (box 118). The display device of the two-way pointing device is monitored, and any response signal transmitted by the appliance interface is observed (box 182). In the case of an appliance with relatively few control options (e.g. some light fixtures), the appliance interface may not transmit response information. In such cases, the method of FIG. 10 becomes similar to the one-way communication method of FIG. 6. Although not shown in FIG. 10 to improve clarity, the method of FIG. 10 may also include the use of either optical or RF transmission if the pointing device and appliance interface are appropriately equipped.

A command signal is then transmitted to the appliance interface (box 184), based upon any user entry control information transmitted by the appliance interface. For example, the command signal of box 184 could comprise a selection of one of the menu items 174 shown in FIG. 9. If further inputs are prompted by responses from the appliance interface (branch 188 of decision box 186), further command signals are transmitted accordingly. When no further inputs are prompted by signals from the appliance interface (branch 190 of box 186), additional command signals may be sent (box 196) if needed (branch 194 of decision box 192). Such commands may elicit response signals from the appliance interface, which are responded to accordingly. When there are no more command signals to transmit (branch 198 of box 192), a de-select signal is sent to the appliance interface (box 138), in the same manner as discussed in the description of FIG. 6 above.

Figure 11:
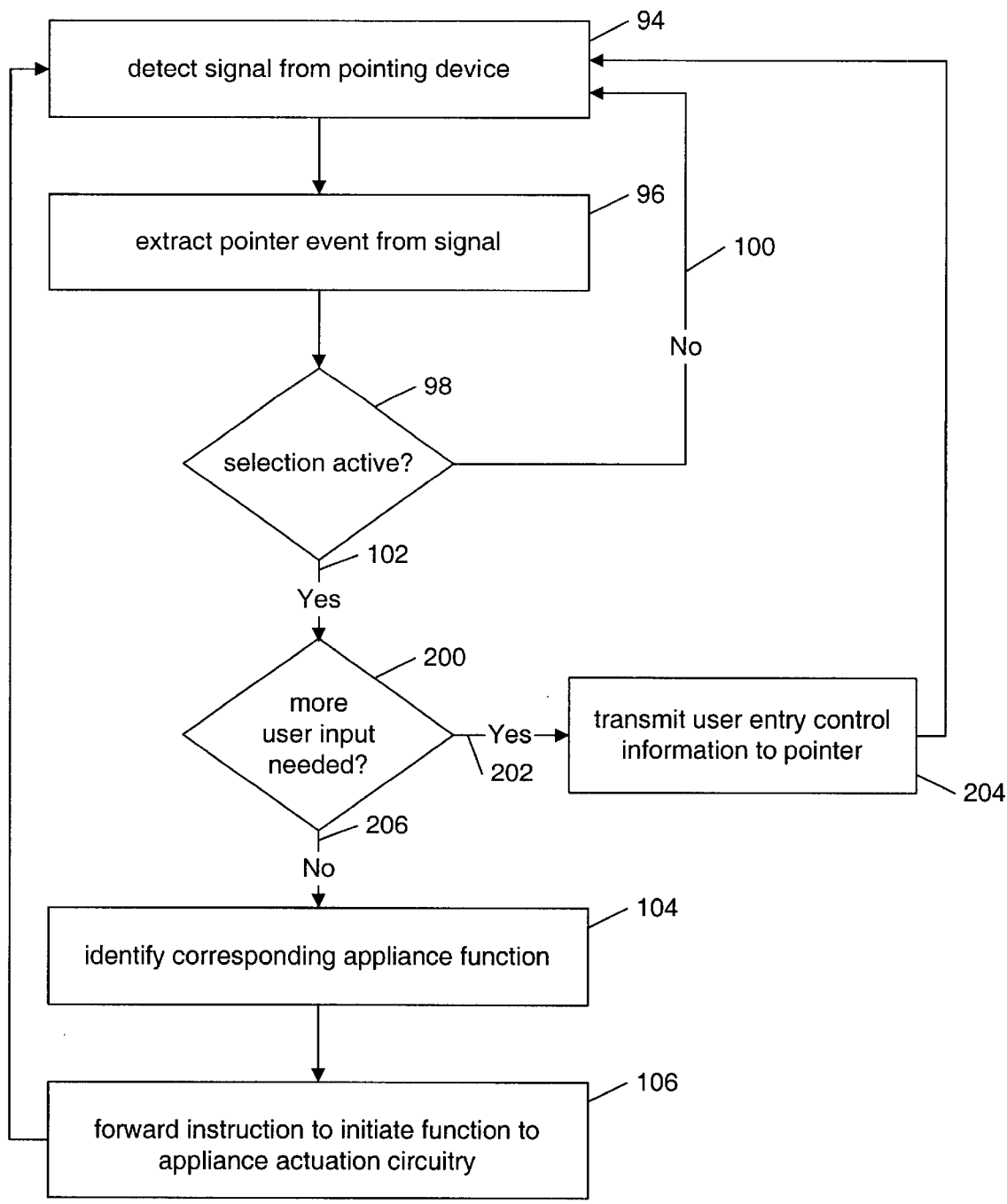
FIG. 11 is a flow diagram illustrating operation of an appliance interface as shown in FIG. 8.

A flow diagram illustrating an exemplary embodiment of the operation of an appliance interface during a two-way communication such as that of FIG. 10 is shown in FIG. 11. The operation sequence of FIG. 11 is similar in some respects to that shown in FIG. 4 for a one-way communication. A signal transmitted by a pointing device is detected (box 94), and a pointer event or command is extracted from the signal (box 96). If selection of the appliance by the pointing device is not active (branch 100 of decision box 98), the pointer event is ignored. If selection is active (branch 102), a determination is made as to whether additional user input should be prompted (decision box 200). Such a determination may be made by identifying appliance response information, if any, which corresponds to a particular pointer event or sequence of pointer events. Such an identification may be carried out in a similar manner to the identification of an appliance function which corresponds to a pointer event (box 104 in FIGS. 4 and 11), and may be performed using driver 86 of FIGS. 3 and 8. For example, the driver may access a data structure which contains a correspondence between pointer events, and/or sequences of pointer events, and the appropriate appliance response information and/or appliance functions.

If an appliance response is appropriate (branch 202 of decision box 200), the corresponding user entry control information is transmitted to the pointing device (box 204), and the subsequent signal transmitted by the pointing device is detected (box 94). If no further user input is to be prompted (branch 206 of box 200), the appliance function corresponding to the received pointer event or series of pointer events is identified (box 104), and an instruction to initiate this function is forwarded to the appliance actuation circuitry (box 106).

Figure 12:
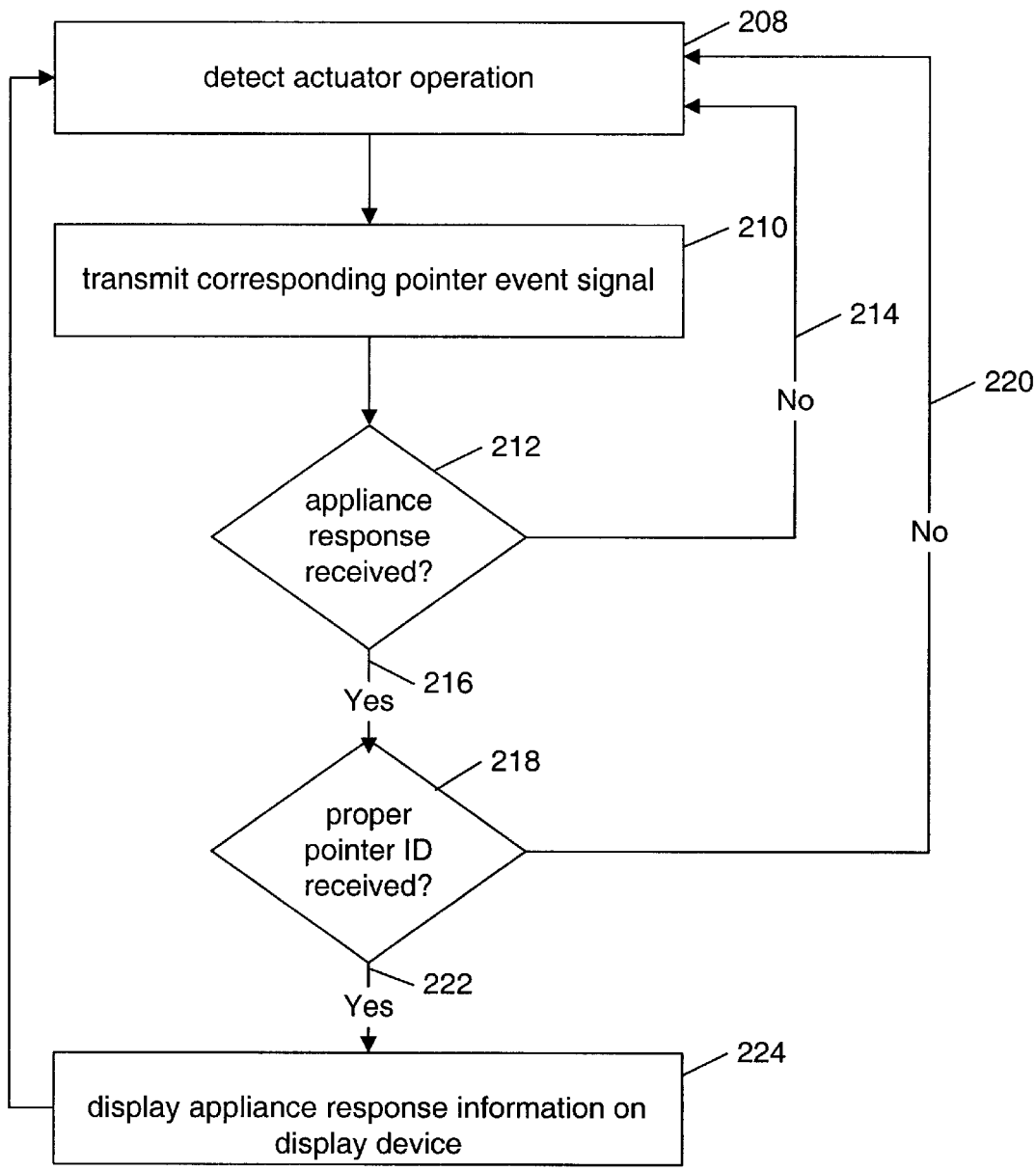
FIG. 12 is a flow diagram illustrating operation of a pointing device as shown in FIG. 7.

Turning now to FIG. 12, a flow diagram illustrating operation of a pointing device during a two-way communication such as that illustrated in FIG. 10 is shown. In general, operation of the pointing device may be viewed as a continuous cycle of detecting actuator operation (box 208) and transmitting corresponding pointer event signals to an appliance interface (box 210). For the two-way communication of FIG. 12, an appliance response signal may be received (branch 216 of box 212). If RF transmission between the appliance interface and the pointer is employed, a pointer identification code may be included in the transmitted signals. If the proper pointer identification code is included in the received appliance response signal (branch 222 of decision box 218), information from the appliance response signal is displayed on the pointer's display device (box 224) to prompt further actuator operation by the user.

Figure 13A:
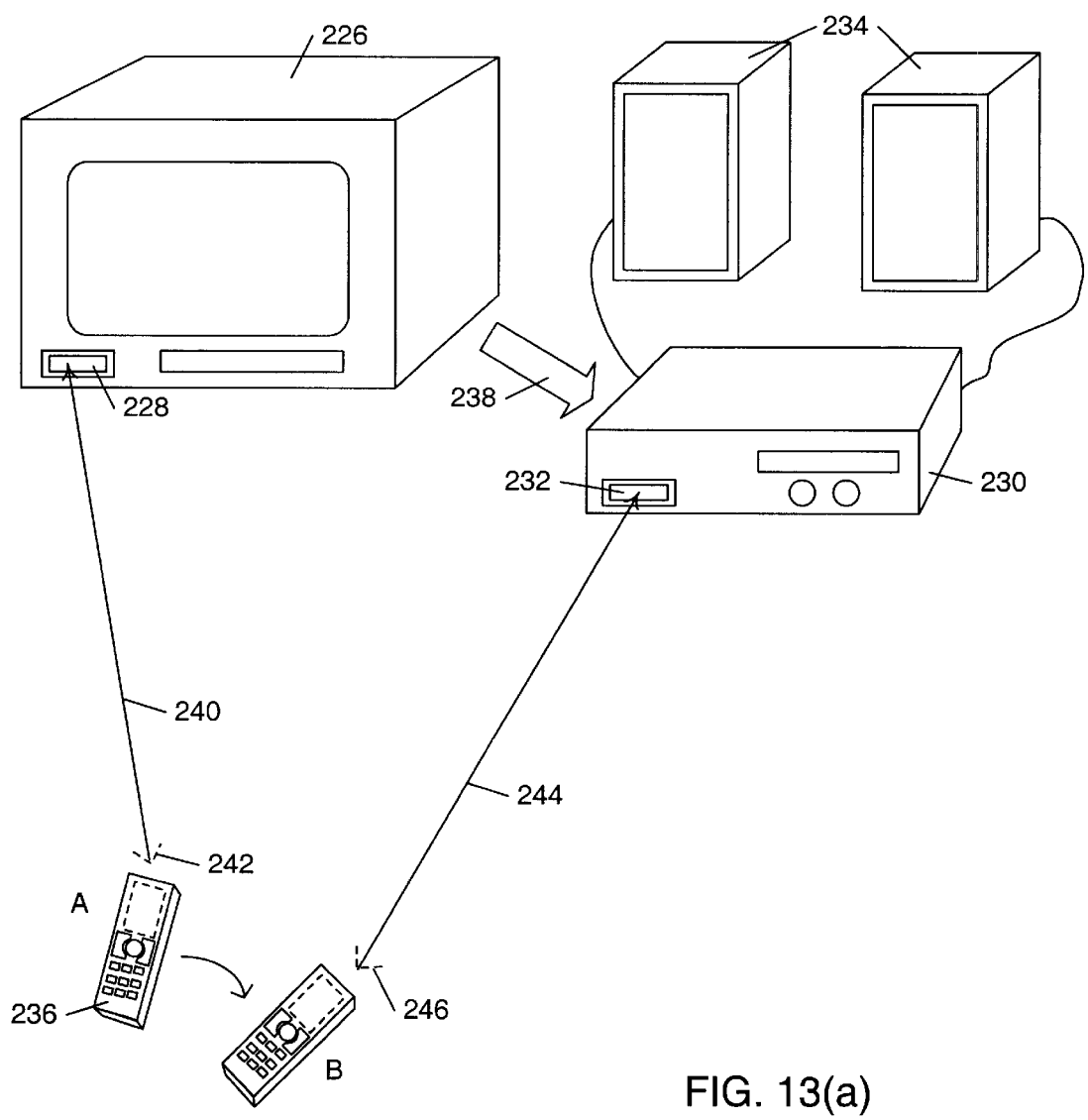
FIG. 13 illustrates use of a pointing device to direct communication between two pointer-compatible appliances.

Many of the embodiments described above involve using a generalized pointing device for communication with one of any number of pointer-compatible appliances. FIG. 13 illustrates an example of using a pointing device to direct communication between more than one pointer-compatible appliance. Such communication between appliances typically involves a transfer of information from one appliance to another. In the embodiment of FIG. 13(a), for example, it may be desirable to transmit an audio information signal from television 226 to stereo unit 230, so that the television audio signal may be heard through speakers 234 connected to the stereo unit. This transmittal is illustrated by arrow 238 representing the audio information signal. In the embodiment of FIG. 13(a), audio information signal 238 is transmitted between appliances 226 and 230 along an existing transmission path between the appliances. For example, appliances 226 and 230 may each be connected into a wired or wireless network. Such networking of appliances inside and outside of the home, as in, e.g., "smart house" technology, is anticipated to become increasingly prevalent.

The sequence of directing the transmission of audio information signal 238 between appliances 226 and 230 is illustrated in FIG. 13(a) by showing two steps of using pointing device 236, step A and step B. Step A involves using pointer 236 to communicate with appliance interface 228 of television 226. Solid arrow 240 represents transmission from pointer 236 to interface 228. Dashed-line arrowhead 242 represents possible transmission from interface 228 back to pointer 236, so that two-way communication takes place. Two-way communication between the pointing device and each appliance is preferred for direction of communication between appliances, in part because of the relative complexity of commands which may be needed to, for example, direct an appliance to transmit a particular type of data to another appliance. After television 226 is instructed to transmit signal 238 containing its audio information, pointer 236 is reoriented for transmission to appliance interface 232 in step B. In the embodiment of FIG. 13(a), a short, line-of-sight transmission path between pointer 236 and each appliance interface is used. Such a path is compatible with a communication method in which an optical selection signal is used, possibly in conjunction with optical command signals. Solid arrow 244 represents transmission from pointer 236 to appliance interface 232 of appliance 230, while dashed arrowhead 246 represents possible two-way communication between the pointer and appliance. In step B, pointer 236 may be used to instruct stereo unit 230 to receive signal 238 and forward it to speakers 234.

The "movement" of the television audio signal to the stereo speakers illustrated in FIG. 13(a) may be analogous to the "drag-and-drop" feature of a computer GUI. In a manner similar to moving an file icon from one drive icon on a computer screen to another using a mouse, the audio signal may be "moved" from the television to the stereo. In some embodiments of the system, the pointer and appliance interface may even be configured to use a similar actuation sequence to that used when dragging with a mouse. For example, depression of a pointer button with the pointer directed toward the transmitting appliance interface could cause the transmitting appliance to send information, while reorientation of the pointer with the button still depressed and subsequent release of the button with the pointer directed toward the receiving appliance interface could select the receiving appliance and direct it to receive the transmitted information.

Figure 13B:
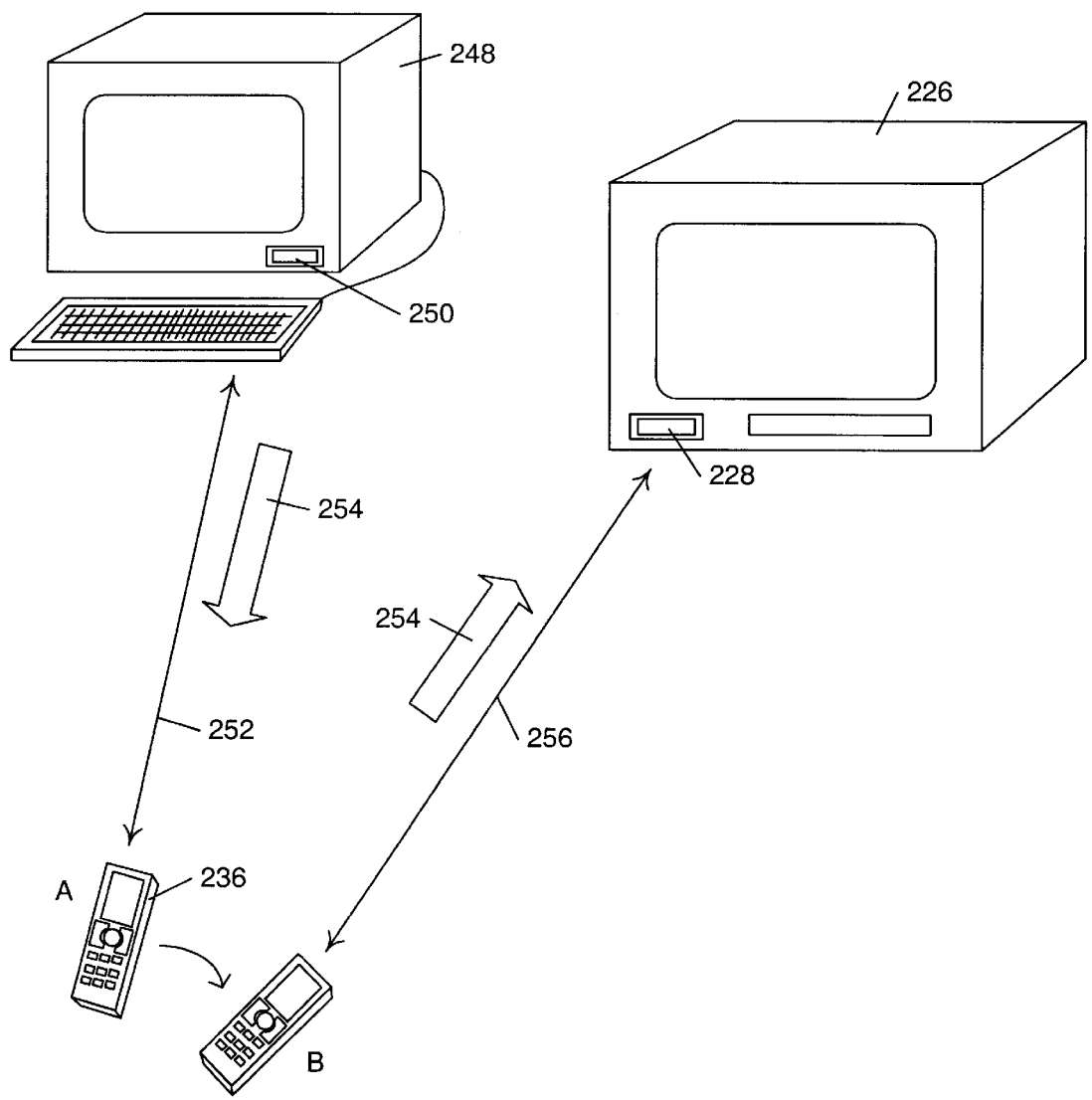

An alternative method of directing communication between two appliances is illustrated in FIG. 13(b). In this embodiment, the only transmission path between the appliances is provided by the pointing device. Such a path configuration may not be advantageous for the application of FIG. 13(a), in that a continuous communication path is required between the appliances for as long as routing of the television audio signal through the stereo speakers is desired. Use of the pointing device to provide such a connection may make it unusable for other purposes for the duration of the transmission period. For applications in which communication between the appliances is needed for only a short time, however, a pointer-mediated transmission path may allow communication between appliances between which no other communication path exists. FIG. 13(b) illustrates an embodiment in which an image is transmitted from a computer for viewing on a television screen. A system configured for two-way communication between the pointing device and each appliance interface is required for implementation of embodiments in which the pointer mediates the transmission path. In step A of FIG. 13(b), pointer 236 is used to instruct computer 248 to transmit image data 254 from appliance interface 250 to pointer 236. Pointer 236 is then reoriented for communication with appliance interface 228 of television 226 in step B. Through two-way communications link 256, pointer 236 instructs appliance interface 228 to receive transmission of data 254 from the pointer.

In the embodiment of FIG. 13(a) above, audio information signal 238 may be transmitted to appliance interface 232 before an instruction to receive this transmission is transmitted to interface 232. In the application of FIG. 13(a), this may result only in a somewhat later initiation of routing of the television sound through the stereo speakers. If the transmission path configuration of FIG. 13(a) is used for an application such as that of FIG. 13(b), in which a limited amount of specific data is to be transferred between appliances, the delay between the pointer's instructions to the transmitting appliance and those to the receiving appliance may be more problematic.

One approach to the above-described delay problem is to first use the pointer to instruct the receiving appliance to receive an upcoming transmission, and then use the pointer to instruct the transmitting appliance to make the transmission. This approach may be helpful in cases for which the transmitting and receiving appliances are located in close proximity to each other. In cases for which a pointer is used to move information between appliances at substantially different locations, however, it may not be feasible to communicate first with the receiving appliance, since the user may typically wish to be at the location of the receiving appliance when the transmitted data is received, in order to make use of the data. Another possible approach to this problem may be to configure the transmitting appliance to send the data repeatedly until a reception confirmation signal is sent by the receiving appliance. However, such an approach may lead to excessive "crowding" by unreceived data on any network linking the appliances, particularly in the case of large networks linking many communicating appliances.

An improved approach to the above problem may be provided by a method combining the transmission path configurations of FIG. 13(a) and FIG. 13(b). In such a method, the pointer-mediated transmission path of FIG.

13(b) is first used to transmit a limited amount of location and/or identification information from a first appliance to a second appliance. The second appliance may then be able use this information to perform a pointer-initiated "fetch" of further data directly from the first appliance, using a pointer-independent transmission link (such as a network) between the appliances to obtain this further data. As an example, a pointer could be used to direct an office computer to transmit to the pointer information including the network address for the computer and the name and location of a particular file on the computer. The pointer, having this information stored, could then be taken over a large distance to another computer, e.g. a home computer, which is connected through a network to the office computer. The pointer could then be used to transmit the network address and file information to the home computer, along with instructions to retrieve the file from the office computer. The home computer may comply with this request by using the network to access the office computer. In this way, no transmission is sent over the network by an appliance until a second appliance is configured to receive such a transmission.

Figure 14:
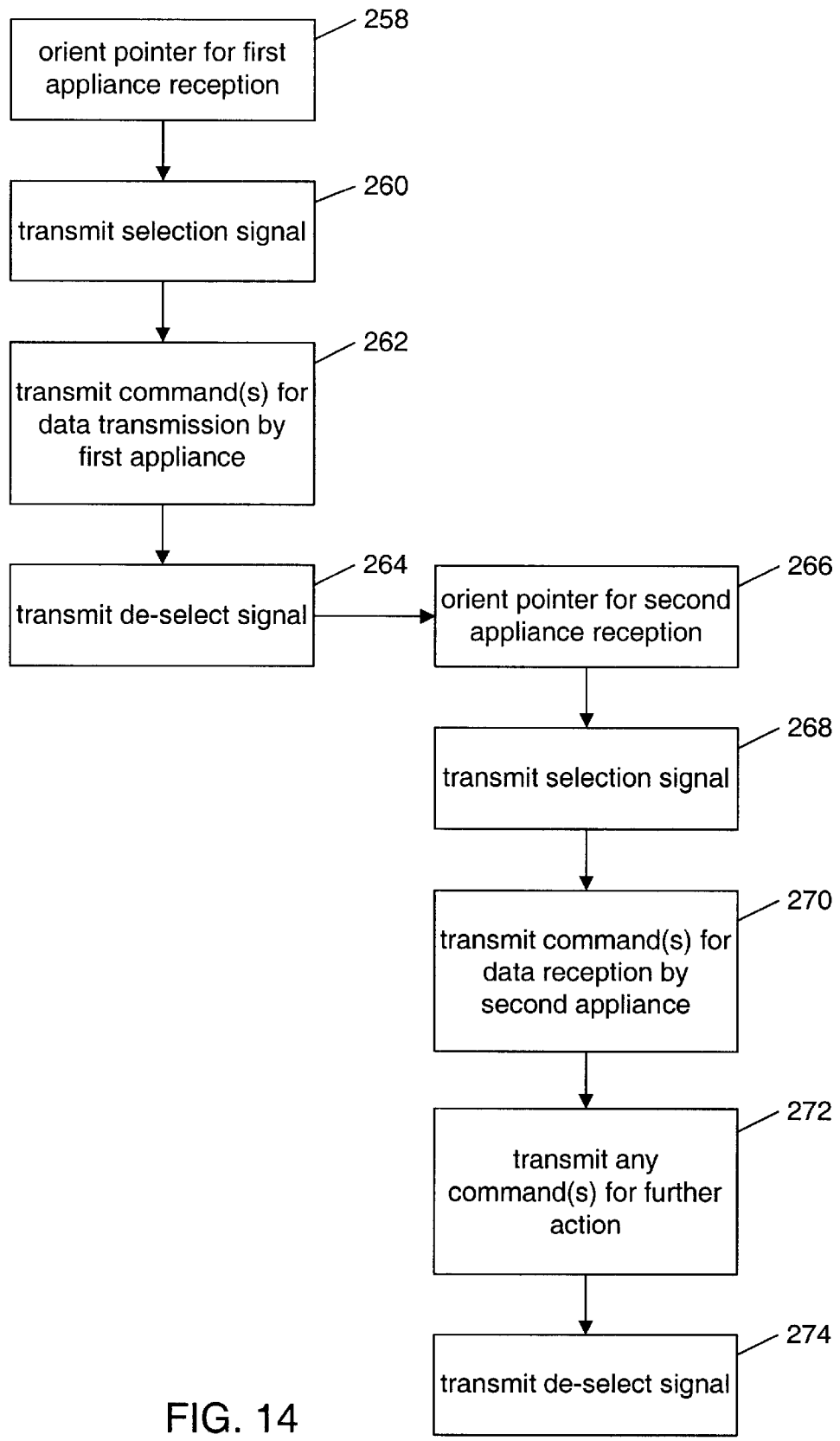
FIG. 14 is a flow diagram illustrating a method of using a pointing device to direct communication between two pointer-compatible appliances.

Turning now to FIG. 14, a flow diagram showing an embodiment of a method or directing communication between two appliances is shown. As in the case of other method embodiments recited herein, the pointing device is oriented such that its signals are receivable by a first appliance (box 258), and a selection signal is sent to the first appliance (box 260). A command may then be transmitted by the pointing device to initiate data transmission by the first appliance (box 262). This data transmission may be directed to the pointing device, or to another appliance through a pointer-independent communications link between the appliances. A de-select signal may then be transmitted to the first appliance (box 264), so that unintentional transmission of subsequent pointer commands to the first appliance is avoided. The appliance interface of the first appliance is preferably configured such that de-selection of the appliance does not interfere with carrying out of instructions transmitted prior to the de-selection.

The pointing device is then oriented for reception by a second appliance (box 266), and a selection signal is transmitted to the second appliance (box 268). A command may then be transmitted to initiate reception of the data transmitted by the first appliance (box 270). This reception may be of data transmitted over a pointer-independent communications link between the first and second appliances, or it may be of data transmitted by the pointing device. After reception of the data by the second appliance, the pointer may be used to transmit commands for further action to the second appliance (box 272), after which a de-select signal may be sent to the second appliance (box 274). As noted above, pointer interaction with the second (receiving) appliance may be performed before pointer interaction with the first (transmitting) appliance in some embodiments, particularly if the first and second appliances are in relatively close proximity to each other.

Figure 15A:
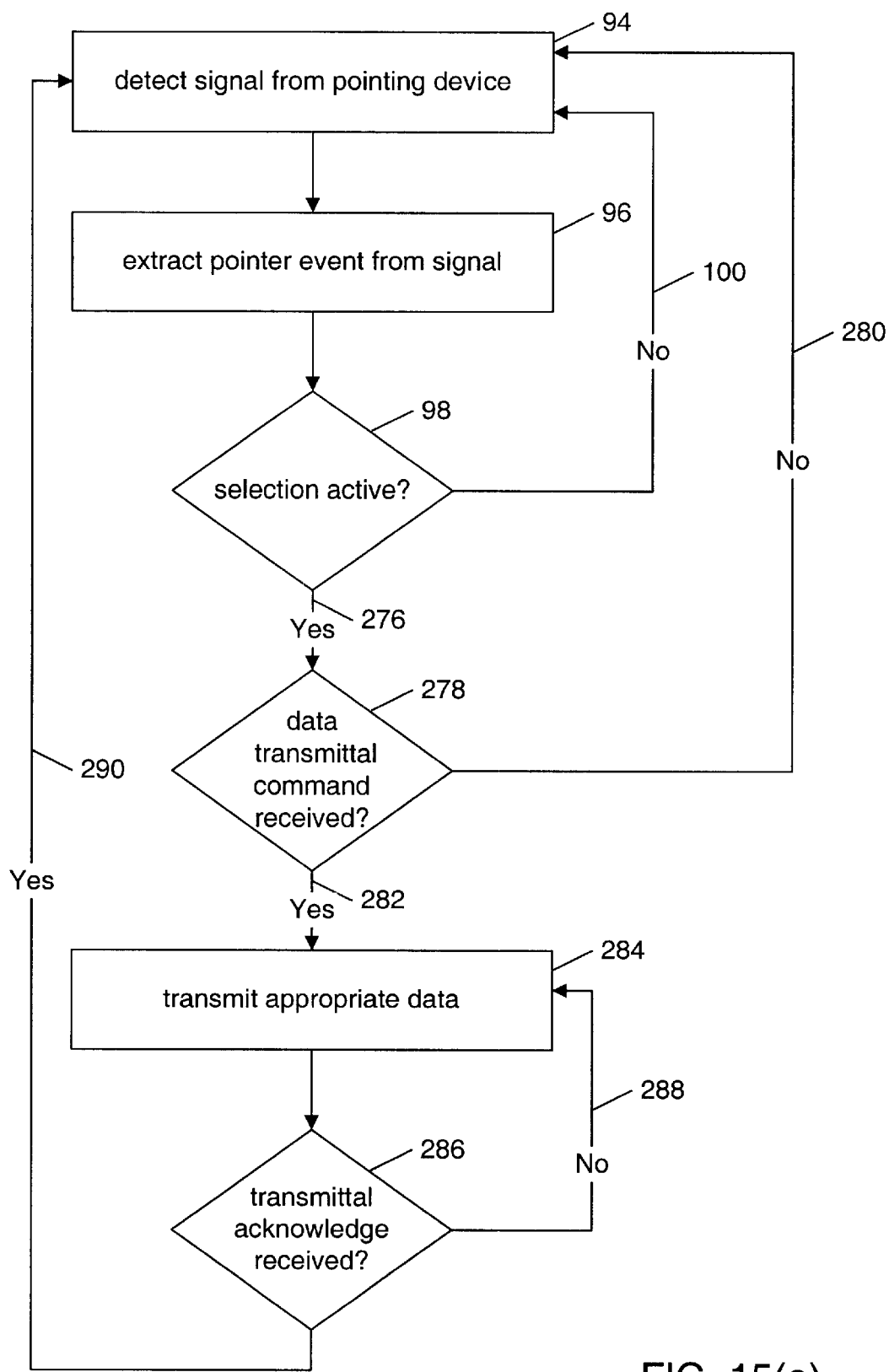
FIG. 15 includes flow diagrams illustrating operation of the appliance interfaces of transmitting and receiving appliances during pointer-directed communication between two appliances.
Figure 15B:
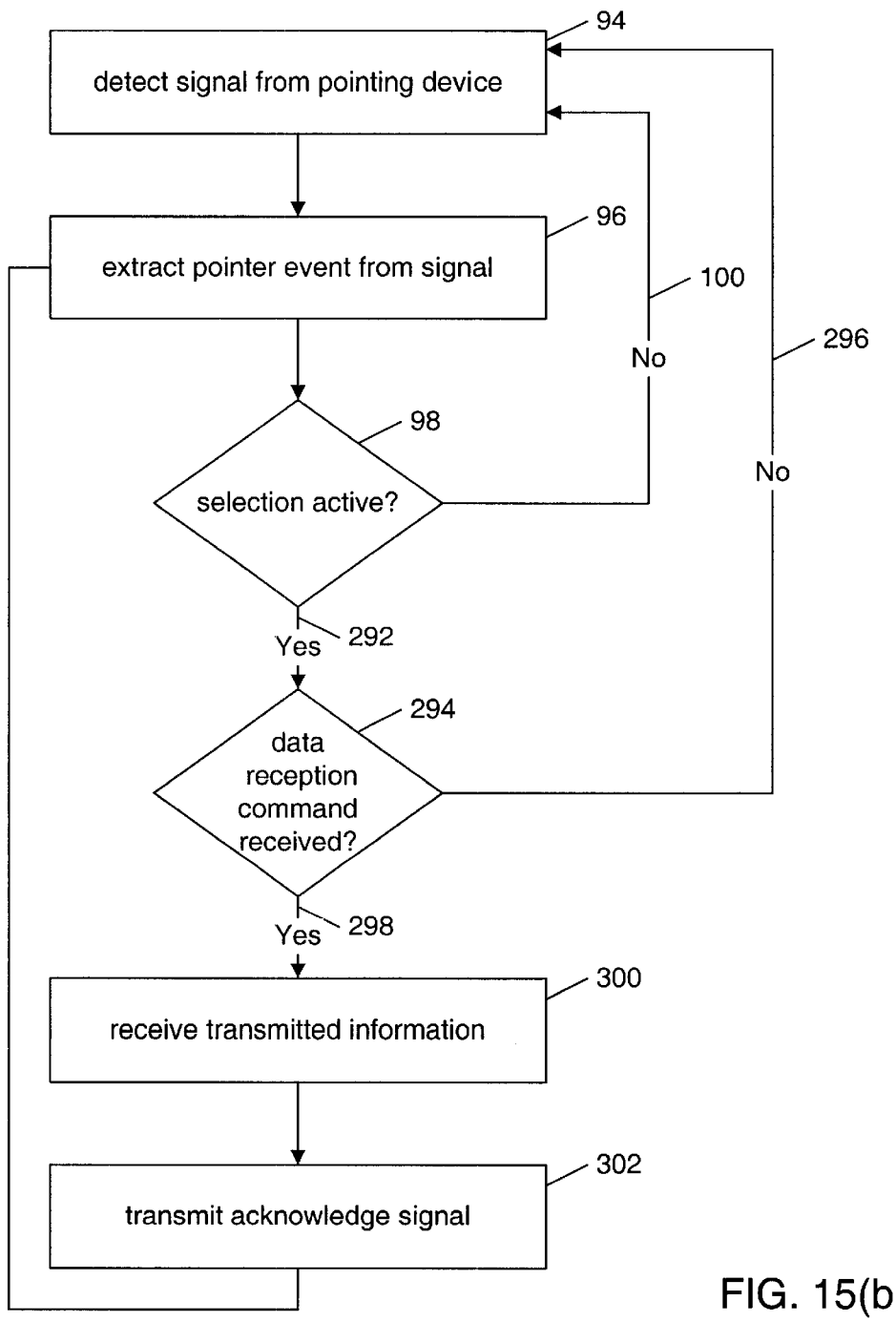

Operation of an appliance interface for an appliance used in a method such as that of FIG. 14 is illustrated by flow diagrams in FIG. 15. The diagram of FIG. 15(a) illustrates an embodiment of the operation of an appliance interface which transmits data to another appliance, while that of FIG. 15(b) illustrates exemplary operation of an appliance interface receiving data from another appliance. In the transmitting appliance operation of FIG. 15(a), a pointer event signal is detected, the pointer command is extracted from the signal, and selection of the appliance is checked before taking further action in response to the pointer event, as also shown in the embodiments of FIGS. 4 and 11. If a selection signal is active (branch 276 of decision box 98) and a command to transmit information is received from the pointing device (branch 282 of decision box 278), transmission of the appropriate data is initiated (box 284). The determination of whether a command to transmit information is received is preferably implemented by identifying the appliance function and/or appliance response corresponding to the received pointer event, as illustrated in more detail in FIGS. 4 and 11. In the embodiment of FIG. 15(a), the data transmission is repeated (branch 288 of decision box 286) until an acknowledgement is returned by the receiving appliance.

The appliance interface operation illustrated in FIG. 15(b) for a receiving appliance differs from that of FIG. 15(a) in that data is received (box 300) in response to a corresponding pointer command (box 294). An acknowledgement signal may then be transmitted back to the transmitting appliance (box 302). The data may be received either from the pointing device or from the transmitting appliance along a pointer-independent transmission path. Similarly, the acknowledgement signal may be transmitted back using either one of these routes.

It will be appreciated by those skilled in the art having the benefit of this disclosure that this invention is believed to provide a system and methods for communication with addressable electronically-controllable appliances using a generalized pointing device. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A computer-usable carrier medium comprising program instructions operable for controlling an electronic appliance, said carrier medium comprising:

pointer command data corresponding to commands transmitted by a pointing device in response to operation of an actuator configured upon the pointing device;

appliance function data corresponding to appliance functions controllable using the pointing device;

a data structure creating a correspondence between the pointer command data and the appliance function data;

an appliance-specific instruction based on the appliance function data, wherein said instruction is executably adapted to initiate performance of an appliance function in response to a command transmitted by the pointing device; and appliance de-selection data corresponding to a de-selection signal transmitted by the pointing device, wherein said de-selection data is adapted to prevent performance of subsequent appliance functions.

2. The carrier medium as recited in claim 1, wherein said carrier medium comprises a wire, cable, or wireless transmission path.

3. The carrier medium as recited in claim 1, wherein said carrier medium comprises an analog or digital signal traveling along a wire, cable, or wireless transmission path.

4. The carrier medium as recited in claim 1, wherein said carrier medium comprises an electromagnetic wave traveling along a wire, cable, or wireless transmission path.

5. The carrier medium as recited in claim 1, wherein said appliance-specific instruction comprises a byte of the appliance function data.

6. The carrier medium as recited in claim 1, further comprising appliance response data corresponding to user entry control information transmitted to the pointing device, wherein said data structure further comprises a correspondence between the pointer command data and the appliance response data.

7. The carrier medium as recited in claim 1, wherein said carrier medium comprises a storage medium.

8. The carrier medium as recited in claim 7, wherein said storage medium comprises a magnetic disk, optical disk, magnetic tape, read-only memory, or random access memory.

9. The carrier medium as recited in claim 1, wherein said pointer command data comprises a memory location address.

10. The carrier medium as recited in claim 9, wherein said data structure comprises a memory map.

11. A computer-usable carrier medium comprising program instructions operable for controlling an electronic appliance, wherein the program instructions are executable to implement:

detecting a pointer signal transmitted from a pointing device to an appliance interface coupled to said appliance;

extracting a pointer command from the pointer signal;

identifying an appliance function corresponding to the pointer command;

forwarding an instruction for initiating the appliance function to appropriate circuitry within the appliance; and detecting a de-selection signal transmitted from the pointing device to the appliance interface, wherein said detecting a de-selection signal prevents the appliance interface from detecting pointer signals subsequently transmitted from the pointing device.

12. The carrier medium as recited in claim 6, wherein said carrier medium comprises a storage medium.

13. The carrier medium as recited in claim 1, wherein said identifying an appliance function comprises comparing the extracted pointer command to a data structure relating pointer command data to appliance function data.

14. The carrier medium as recited in claim 6, further comprising:

determining whether an appliance response corresponds to the pointer command;

transmitting an appliance signal representing any corresponding appliance response to the pointing device;

detecting any additional pointer signal transmitted from the pointing device in response to the appliance signal; and extracting an additional pointer command from the any additional pointer signal, subsequent to said extracting a pointer command and prior to said identifying an appliance function, wherein said identifying an appliance function further comprises identifying an appliance function corresponding to a sequence including the pointer command and the additional pointer command.

* * * * *

UNITED STATES PATENT AND TRADEMARK OFFICE
CERTIFICATE OF CORRECTION

PATENT NO. : 6,570,524 B1
DATED : June 30, 1999
INVENTOR(S) : Mullaly et al.

It is certified that error appears in the above-identified patent and that said Letters Patent is hereby corrected as shown below:

<u>Column 20,</u>
Line 8, please delete the phrase "as recited in claim 1" and substitute therefor -- as recited in claim 11 --.

Signed and Sealed this

Twenty-seventh Day of January, 2004

JON W. DUDAS
*Acting Director of the United States Patent and Trademark Office*